United States Patent
Kato et al.

(10) Patent No.: US 11,764,395 B2
(45) Date of Patent: Sep. 19, 2023

(54) ALL-SOLID-STATE BATTERY

(71) Applicant: Murata Manufacturing Co., Ltd., Nagaokakyo (JP)

(72) Inventors: Tomohiro Kato, Nagaokakyo (JP); Hiroe Ishihara, Nagaokakyo (JP); Kiyoshi Kumagae, Nagaokakyo (JP); Keisuke Shimizu, Nagaokakyo (JP)

(73) Assignee: MURATA MANUFACTURING CO., LTD., Nagaokakyo (JP)

( * ) Notice: Subject to any disclaimer, the term of this patent is extended or adjusted under 35 U.S.C. 154(b) by 528 days.

(21) Appl. No.: 16/924,501

(22) Filed: Jul. 9, 2020

(65) Prior Publication Data

US 2020/0350613 A1  Nov. 5, 2020

Related U.S. Application Data

(63) Continuation of application No. PCT/JP2019/007171, filed on Feb. 26, 2019.

(30) Foreign Application Priority Data

Feb. 26, 2018 (JP) ................. 2018-031749

(51) Int. Cl.
  *H01M 10/056* (2010.01)
  *H01M 4/36* (2006.01)
  (Continued)

(52) U.S. Cl.
  CPC ......... *H01M 10/056* (2013.01); *H01M 4/366* (2013.01); *H01M 10/0585* (2013.01);
  (Continued)

(58) Field of Classification Search
  CPC .................................................. H01M 10/056
  See application file for complete search history.

(56) References Cited

U.S. PATENT DOCUMENTS

| 2008/0003492 A1 | 1/2008 | Bates |
| 2010/0068617 A1 | 3/2010 | Bedjaoui et al. |
| (Continued) | | |

FOREIGN PATENT DOCUMENTS

| JP | 2000216044 A | 8/2000 |
| JP | 2001052751 A | 2/2001 |
| (Continued) | | |

OTHER PUBLICATIONS

Rebib et.al; "Determination of optical properties of a-SiOxNy thin films by ellipsometric and UV-visible spectroscopies"; (Year: 2008).*

(Continued)

*Primary Examiner* — Nathanael T Zemui
(74) *Attorney, Agent, or Firm* — ArentFox Schiff LLP

(57) ABSTRACT

An all-solid-state battery that includes a power storage part having a positive electrode layer, a negative electrode layer, and an electrolyte layer interposed between the positive electrode layer and the negative electrode layer; an internal electrode at an end surface of the power storage part; an electrode extraction part electrically connected to the internal electrode; a buffer layer covering the power storage part, the internal electrode, and a first part of the electrode extraction part; a barrier layer covering the buffer layer; and an impact-resistant layer covering the barrier layer such that a second part of the electrode extraction part extends from the impact-resistant layer.

18 Claims, 29 Drawing Sheets

(51) Int. Cl.
  *H01M 10/0585* (2010.01)
  *H01M 4/02* (2006.01)
  *H01M 50/543* (2021.01)
  *H01M 50/54* (2021.01)

(52) U.S. Cl.
  CPC .......... *H01M 50/54* (2021.01); *H01M 50/543* (2021.01); *H01M 2004/027* (2013.01); *H01M 2004/028* (2013.01); *H01M 2300/0065* (2013.01)

(56) References Cited

U.S. PATENT DOCUMENTS

| | | | |
|---|---|---|---|
| 2014/0308580 A1 | 10/2014 | Kamada | |
| 2017/0301891 A1* | 10/2017 | Kwak | H01M 50/124 |
| 2018/0226626 A1* | 8/2018 | Maeda | H01M 10/0525 |

FOREIGN PATENT DOCUMENTS

| | | |
|---|---|---|
| JP | 2002329493 A | 11/2002 |
| JP | 2004146297 A | 5/2004 |
| JP | 2006351326 A | 12/2006 |
| JP | 2010073687 A | 4/2010 |
| JP | 2010519675 A | 6/2010 |
| JP | 2013180473 A | 9/2013 |
| JP | 2015220099 A | 12/2015 |
| JP | 2016001601 A | 1/2016 |

OTHER PUBLICATIONS

International Search Report Issued for PCT/JP2019/007171, dated May 7, 2019.
Written Opinion of the International Searching Authority issued for PCT/JP2019/007171, dated May 7, 2019.

* cited by examiner

ALL-SOLID-STATE BATTERY

CROSS REFERENCE TO RELATED APPLICATIONS

The present application is a continuation of International application No. PCT/JP2019/007171, filed Feb. 26, 2019, which claims priority to Japanese Patent Application No. 2018-031749, filed Feb. 26, 2018, the entire contents of each of which are incorporated herein by reference.

FIELD OF THE INVENTION

The present technology relates to an all-solid-state battery having a package structure.

BACKGROUND OF THE INVENTION

Conventional lithium ion secondary batteries mainly use a liquid (electrolytic solution) as an electrolyte. Typical electrolytic solutions including ethylene carbonate (EC) are flammable substances. This has caused a problem that the electrolytic solution leaks and becomes insufficient during use or storage and the like, and a problem that the electrolytic solution ignites when a short circuit occurs. A battery developed to overcome these problems is an all-solid-state battery. The electrolyte of the all-solid-state battery is solid, and nonflammable, so that the electrolyte causes does not have the problems of leakage or ignition.

However, the all-solid-state battery has a problem in that the ingression of moisture contained in the air is apt to cause deterioration in the all-solid-state battery. For this reason, barrier layers such as a protective layer described in Patent Document 1 and a waterproof layer described in Patent Document 2 have been proposed. Patent Document 1 discloses an all-solid-state battery having a structure in which a protective layer is disposed on the surface of a power storage layer and an end is raised. Patent Document 2 discloses an all-solid-state battery having a structure in which a surface of a power storage layer is covered by a waterproof layer and the outside is covered by an elastic layer.

Patent Document 1: Japanese Patent Application Laid-Open No. 2016-001601
Patent Document 2: Japanese Patent Application Laid-Open No. 2015-220099

SUMMARY OF THE INVENTION

The all-solid-state battery generally undergoes expansion and contraction similar to those of a polymer battery during charge and discharge. When the barrier layer is directly formed on the outer layer of the all-solid-state battery as in Patent Documents 1 and 2, the expansion and contraction of the battery due to charge and discharge causes peeling or cracking to occur in the barrier layer, and the ingression of moisture therefrom may cause deterioration in the all-solid-state battery.

The barrier layer plays a role of preventing not only the ingression moisture but also the diffusion of lithium ions from the all-solid-state battery. The lithium ions affect other mounted components, particularly semiconductor components. This requires devisal for stabilizing the shape of an all-solid-state battery which repeats expansion and contraction during charge and discharge.

Therefore, one of the objects of the present technology is to provide an all-solid-state battery having a package structure in which no peeling or crack occurs in a barrier layer during discharge and charge.

This technology is an all-solid-state battery that includes a power storage part having a positive electrode layer, a negative electrode layer, and an electrolyte layer interposed between the positive electrode layer and the negative electrode layer; an internal electrode at an end surface of the power storage part; an electrode extraction part electrically connected to the internal electrode; a buffer layer covering the power storage part, the internal electrode, and a first part of the electrode extraction part; a barrier layer covering the buffer layer; and an impact-resistant layer covering the barrier layer such that a second part of the electrode extraction part extends from the impact-resistant layer.

Such a configuration causes no ingress of moisture into the barrier layer of the all-solid-state battery even if charge and discharge are repeated, so that deterioration in the all-solid-state battery can be prevented.

In the all-solid-state battery, the electrode extraction part preferably has a plate shape; a third part of the electrode extraction part is connected to the internal electrode in a direction parallel to the internal electrode; and the second part of the electrode extraction part extending from the impact-resistant layer is bent in an outward direction away from the power storage part.

According to such a configuration, by providing the plate-shaped external terminal, contact resistance can be reduced, and the joining strength of the external terminal with the internal electrode can also be increased by surface contact. Furthermore, the external terminal has been shaped, so that steps such as wire cutting can be omitted.

Further, an electric circuit can be located between the barrier layer and the impact-resistant layer.

For example, a protection circuit for a secondary battery can be provided integrally with the all-solid-state battery, which can provide a reduced mounting space on a printed circuit board on which an electric circuit has been disposed. The diffusion of lithium ions can be prevented, so that the influence of the lithium ions on the electric circuit can be suppressed.

The buffer layer preferably contains a material having flexibility and elasticity.

Such a configuration can cause the buffer layer to absorb the expansion/contraction of the all-solid-state battery.

The material having flexibility and elasticity is, for example, polyimide silicone.

The all-solid-state battery preferably includes two or more buffer layers and/or two or more barrier layers that are alternately and repeatedly stacked.

Such a configuration makes it possible to reliably suppress the ingression of moisture. The diffusion of lithium ions to the outside can be prevented.

The barrier layer preferably contains silicon nitride or silicon oxynitride. More preferably, the barrier layer contains silicon oxynitride having a light refractive index of 1.7 or more.

The impact-resistant layer preferably contains an epoxy resin and silica.

The present technology assists in preventing ingress of moisture into the barrier layer of the all-solid-state battery even if charge and discharge are repeated, so that deterioration in the all-solid-state battery can be prevented. It should be noted that the effects described here are not necessarily limited, and may be any of the effects described in the present technology or effects different from the effects.

DETAILED DESCRIPTION OF THE INVENTION

Embodiments to be described below are preferable specific examples of the present technology, and various technically preferable limitations are imparted to the embodiments. However, the scope of the present technology is not limited to the embodiments unless otherwise specified in the following description.

The description of the present technology will be made in the following order.
<<1. First Embodiment>>
<<2. Second Embodiment>>
<<3. Third Embodiment>>
<<4. Application Examples>>

1. First Embodiment

"All-Solid-State Battery"

An all-solid-state battery which can be used in the present technology will be described. An all-solid-state battery according to a first embodiment is characterized in that the periphery of a positive electrode layer and a negative electrode layer is covered by a barrier layer in order to prevent the ingression of moisture into the all-solid-state battery, and a buffer layer on the barrier layer in order to prevent the occurrence of peeling or cracking of the barrier layer by the expansion and contraction of the battery during charge and discharge. This configuration can prevent the ingression of moisture even when charge and discharge are repeated, so that deterioration in the all-solid-state battery can be prevented.

"Configuration of Battery"

Figure 1:
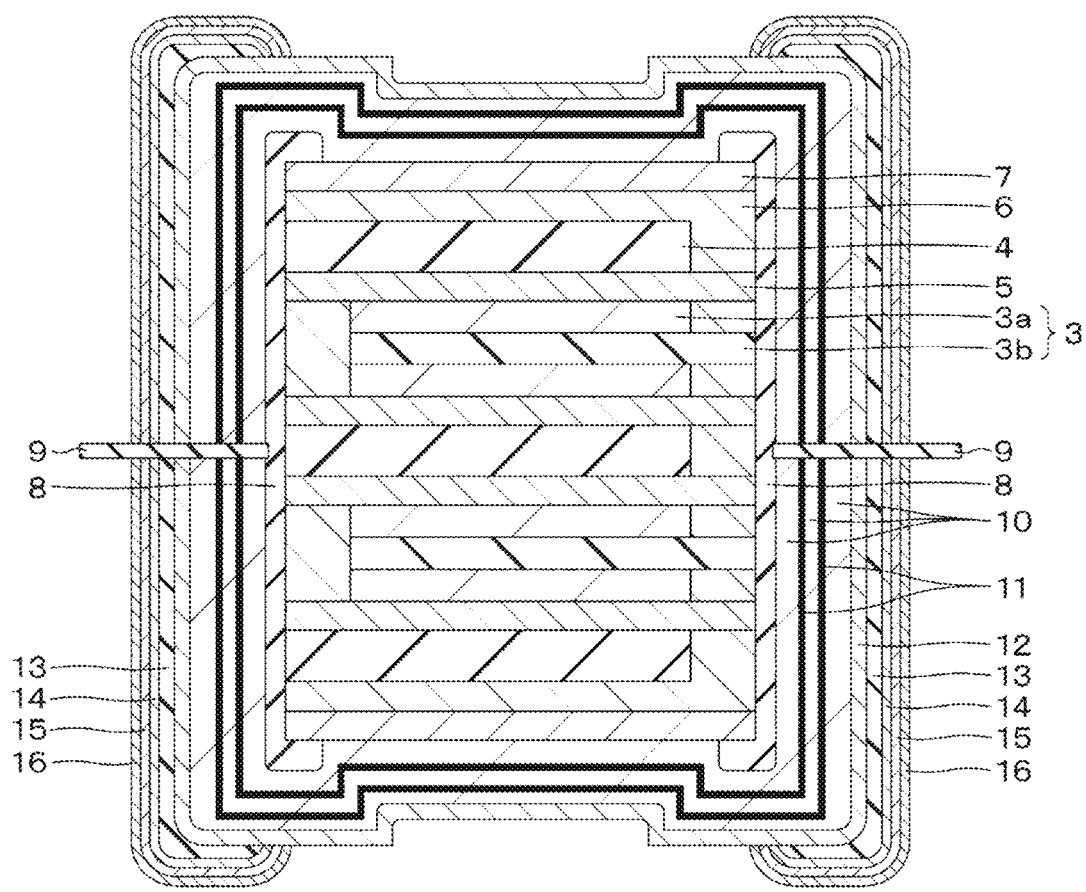
FIG. 1 is a sectional view for illustrating an all-solid-state battery according to a first embodiment of the present technology.

FIG. 1 is a sectional view illustrating the configuration of an all-solid-state battery according to a first embodiment. In FIG. 1, a power storage part is provided in an all-solid-state battery 1, and an internal electrode is attached to each of both left and right ends of the power storage part in FIG. 1. The power storage part includes a structure obtained by laminating a solid electrolyte layer 5, a positive electrode layer 3 (positive electrode active material layer 3a and positive electrode current collecting layer 3b) provided on one main surface of the solid electrolyte layer 5, and a negative electrode layer 4 (negative electrode active material layer and negative electrode current collecting layer) provided on the other main surface of the solid electrolyte layer 5. The periphery of these layers is partially covered by a separation layer 6 and a protective layer 7, and an internal electrode 8 is disposed on each of side surfaces of the positive electrode layer 3 and the negative electrode layer 4. The separation layer 6 electrically insulates the positive electrode layer 3 from the internal electrode 8 connected to the negative electrode layer 4, and electrically insulates the negative electrode layer 4 from the internal electrode 8 connected to the positive electrode layer 3. The protective layer 7 protects the power storage part. A metal wire 9 is electrically connected to the internal electrode 8, and the metal wire 9 extends in a direction substantially perpendicular to the internal electrode 8. The whole of the internal electrode 8 and a part of the metal wire 9 are alternately covered by a buffer layer 10 and a barrier layer 11, and the outside thereof and a part of the metal wire 9 are covered by an impact-resistant layer 12. As illustrated in FIG. 1, the impact-resistant layer 12 and a part of the metal wire 9 are covered by an external electrode 13, and the whole of the external electrode 13 and a part of the metal wire 9 are covered by a Ni plating layer 14, a Sn plating layer 15, and a solder coating 16 in this order. The all-solid-state battery according to the first embodiment illustrated in FIG. 1 includes two positive electrode layers 3 and three negative electrode layers 4, but the number of the positive electrode layers 3 and the number of the negative electrode layers 4 may be 1, and may be plural other than the above.

(Protective Layer)

The protective layer 7 contains a Li-containing solid electrolyte having a Li ion conductivity. The protective layer 7 may contain at least one of Li-free glass, glass ceramics, and crystals having a non-Li ion conductivity. The solid electrolyte is the same as that contained in the solid electrolyte layer 5 to be described later. However, the compositions (types of materials) or composition ratios of the solid electrolytes contained in the solid electrolyte layer 5 and the protective layer 7 may be the same or different.

The volume occupancy of the solid electrolyte in the protective layer 7 is preferably 10 vol % or more, more preferably 20 vol % or more, and still more preferably 30 vol % or more. When the volume occupancy is 10 vol % or more, the diffusion of Li ions from the power storage part to the protective layer 7 can be further reduced, so that an increase in the irreversible capacitance of the battery can be further suppressed. The upper limit of the volume occupancy is not particularly limited, and may be 100 vol %.

The Li ion conductivity of the protective layer 7 is preferably $1.0 \times 10^{-10}$ S/cm or more. When the Li ion conductivity is $1.0 \times 10^{-10}$ S/cm or more, the diffusion of the Li ions from the positive electrode layer 3, the negative electrode layer 4, and the solid electrolyte layer 5 and the like to the protective layer 7 can be further reduced, so that an increase in the irreversible capacitance of the battery can be further suppressed. The Li ion conductivity of the protective layer 7 is determined by an AC impedance method as follows. First, a part of the protective layer 7 is extracted as a rectangular plate-shaped small piece from the all-solid-state battery by ion milling or polishing or the like. Next, an electrode composed of gold (Au) is formed on both ends of the extracted small piece to prepare a sample. Next, AC impedance measurement (frequency: $10^{-1}$ Hz to $10^{+6}$ Hz, voltage: 100 mV, 1000 mV) is performed on the sample at room temperature (25° C.) using an impedance measuring device (manufactured by TOYO Corporation), and a Cole-Cole plot is created. Subsequently, the ion conductivity is determined from the Cole-Cole plot.

(Solid Electrolyte Layer)

The solid electrolyte layer 5 contains a solid electrolyte containing Li. The solid electrolyte is at least one of oxide glass and oxide glass ceramics which are lithium ion conductors, and is preferably the oxide glass ceramics from the viewpoint of improving the Li ion conductivity. When the solid electrolyte is at least one of the oxide glass and the oxide glass ceramics, the stability of the solid electrolyte layer 5 with respect to the atmospheric air (moisture) can be improved. The solid electrolyte layer 5 is, for example, a sintered body of a green sheet as a solid electrolyte layer precursor.

Here, the glass refers to crystallographically amorphous materials such as a halo observed by X-ray diffraction and electron beam diffraction and the like. The glass ceramics (crystallized glass) refers to crystallographically mixed amorphous and crystalline materials, such as peaks and halos observed by the X-ray diffraction and the electron beam diffraction and the like.

The Li ion conductivity of the solid electrolyte is preferably $10^{-7}$ S/cm or more from the viewpoint of improving battery performance. The Li ion conductivity of the solid electrolyte can be obtained in the same manner as the method for measuring the Li ion conductivity of the above-mentioned protective layer 7 except that the solid electrolyte layer 5 is extracted from the all-solid-state battery by the ion milling or the polishing or the like and the measurement sample is prepared using the extracted solid electrolyte layer 5.

The solid electrolyte contained in the solid electrolyte layer 5 is sintered. The sintering temperature of the oxide glass and the oxide glass ceramics which are the solid electrolyte is preferably 550° C. or lower, more preferably 300° C. to 550° C., and still more preferably 300° C. to 500° C.

When the sintering temperature is 550° C. or lower, the carbon material is prevented from being burned down in the sintering step, so that the carbon material can be used as the negative electrode active material. Therefore, the energy density of the battery can be further improved. When the positive electrode active material layer 3a contains a conductive agent, the carbon material can be used as the conductive agent. Therefore, a favorable electron conduction path can be formed in the positive electrode active material layer 3a, to improve the conductivity of the positive electrode active material layer 3a. Even when the negative electrode layer 4 contains a conductive agent, the carbon material can be used as the conductive agent, so that the conductivity of the negative electrode layer 4 can be improved.

When the sintering temperature is 550° C. or lower, the solid electrolyte reacts with the electrode active material in the sintering step to be able to suppress byproducts such as a passivation from being formed. Therefore, the deterioration in the battery characteristics can be suppressed. If the sintering temperature is a temperature of 550° C. or lower, the selection range of the type of the electrode active material is expanded, so that the degree of freedom in the battery design can be improved.

Meanwhile, when the sintering temperature is 300° C. or higher, a general organic binder such as an acrylic resin contained in the electrode precursor and/or the solid electrolyte layer precursor can be burned down in the sintering step.

It is preferable that the oxide glass and the oxide glass ceramics have a sintering temperature of 550° C. or lower, have a high thermal contraction rate, and are rich in fluidity. This is because the following effects can be obtained. That is, the reaction between the solid electrolyte layer 5 and the positive electrode active material layer 3a and the reaction between the solid electrolyte layer 5 and the negative electrode layer 4 can be suppressed. Good interfaces are formed between the positive electrode active material layer 3a and the solid electrolyte layer 5, and between the negative electrode layer 4 and the solid electrolyte layer 5, and an interface resistance between the positive electrode active material layer 3a and the solid electrolyte layer 5 and between the negative electrode layer 4 and the solid electrolyte layer 5 can be reduced.

The oxide glass and the oxide glass ceramics preferably contain at least one of germanium (Ge), silicon (Si), boron (B) and phosphorus (P), lithium (Li), and oxygen (O), and more preferably contain Si, B, Li, and O. Specifically, the oxide glass and the oxide glass ceramics preferably contain at least one of germanium oxide ($GeO_2$), silicon oxide ($SiO_2$), boron oxide ($B_2O_3$), and phosphorus oxide ($P_2O_5$), and lithium oxide ($Li_2O$), and more preferably contain $SiO_2$, $B_2O_3$, and $Li_2O$.

As described above, since the oxide glass and the oxide glass-ceramics containing at least one of Ge, Si, B, and P, Li, and O have a sintering temperature of 300° C. or higher and 550° C. or lower, have a high thermal contraction rate and is also rich in fluidity, the oxide glass and the oxide glass-ceramics are advantageous from the viewpoint of reducing the interface resistance, and improving the energy density of the battery, and the like.

The content of $Li_2O$ is preferably 20 mol % to 75 mol %, more preferably 30 mol % to 75 mol %, still more preferably 40 mol % to 75 mol %, and particularly preferably 50 mol % to 75 mol % from the viewpoint of lowering the sintering temperature of the solid electrolyte.

When the solid electrolyte contains $GeO_2$, the content of $GeO_2$ is preferably more than 0 mol % and 80 mol % or less. When the solid electrolyte contains $SiO_2$, the content of $SiO_2$ is preferably more than 0 mol % and 70 mol % or less. When the solid electrolyte contains $B_2O_3$, the content of $B_2O_3$ is preferably more than 0 mol % and 60 mol % or less. When the solid electrolyte contains $P_2O_5$, the content of $P_2O_5$ is preferably more than 0 mol % and 50 mol % or less.

The content of each oxide is the content of each oxide in the solid electrolyte, and specifically, a ratio of the content (mol) of each oxide to the total amount (mol) of at least one of $GeO_2$, $SiO_2$, $B_2O_3$, and $P_2O_5$, and $Li_2O$ is illustrated in percentage units (mol %). The content of each oxide can be measured using inductively coupled plasma emission spectrometry (ICP-AES) or the like.

The solid electrolyte may further contain an additive element as needed. Examples of the additive element include at least one selected from the group consisting of sodium (Na), magnesium (Mg), aluminum (Al), potassium (K), calcium (Ca), titanium (Ti), vanadium (V), chromium (Cr), manganese (Mn), iron (Fe), cobalt (Co), nickel (Ni), copper (Cu), zinc (Zn), gallium (Ga), selenium (Se), rubidium (Rb), sulfur (S), yttrium (Y), zirconium (Zr), niobium (Nb), molybdenum (Mo), silver (Ag), indium (In), tin (Sn), antimony (Sb), cesium (Cs), barium (Ba), hafnium (Hf), tantalum (Ta), tungsten (W), lead (Pb), bismuth (Bi), gold (Au), lanthanum (La), neodymium (Nd), and europium (Eu). The solid electrolyte may contain at least one selected from the group consisting of these additive elements as oxide.

(Positive Electrode Current Collecting Layer)

The positive electrode current collecting layer 3b contains conductive grains and a solid electrolyte. The conductive grains are, for example, powder. The conductive grains may be sintered. The conductive grains may further contain glass or glass ceramics as needed. The glass or the glass ceramics may be sintered. The solid electrolyte is the same as that contained in the above-described solid electrolyte layer 5. However, the compositions (types of materials) or composition ratios of the solid electrolytes contained in the solid electrolyte layer 5 and the positive electrode current collecting layer 3b may be the same or different.

The positive electrode current collecting layer 3b may be, for example, a metal layer containing Al, Ni, or stainless steel or the like. The shape of the metal layer is, for example, a foil shape, a plate shape, or a mesh shape or the like.

(Positive Electrode Active Material Layer)

The positive electrode active material layer 3a contains a positive electrode active material and a solid electrolyte. The solid electrolyte may have a function as a binder. The positive electrode active material layer 3a may further contain a conductive agent as needed.

The positive electrode active material contains, for example, a positive electrode material capable of occluding and releasing lithium ions which are an electrode reactant. The positive electrode material is preferably a lithium-containing compound or the like from the viewpoint of obtaining a high energy density, but it is not limited thereto. The lithium-containing compound includes, for example, a composite oxide (lithium transition metal composite oxide) containing lithium and a transition metal element as a constituent element, and a phosphate compound (lithium transition metal phosphate compound) containing lithium and a transition metal element as a constituent element, and the like. Among them, the transition metal element is preferably one or two or more of Co, Ni, Mn, and Fe. As a result, a higher voltage can be obtained, and if the voltage of the battery can be increased, the energy (Wh) of the battery having the same capacitance (mAh) can be increased.

The lithium transition metal composite oxide is, for example, one represented by $Li_xM1O_2$ or $Li_yM2O_4$ or the like. More specifically, for example, the lithium transition metal composite oxide is $LiCoO_2$, $LiNiO_2$, $LiVO_2$, $LiCrO_2$, or $LiMn_2O_4$ or the like. The lithium transition metal phosphate compound is, for example, one represented by $Li_zM3PO_4$ or the like. More specifically, for example, the lithium transition metal phosphate compound is $LiFePO_4$ or $LiCoPO_4$ or the like. However, M1 to M3 are one or two or more transition metal elements, and values of x to z are optional.

In addition, the positive electrode active material may be, for example, oxide, disulfide, chalcogenide, or a conductive polymer. The oxide is, for example, titanium oxide, vanadium oxide, or manganese dioxide or the like. The disulfide is, for example, titanium disulfide or molybdenum sulfide or the like. The chalcogenide is, for example, niobium selenide or the like. The conductive polymer is, for example, disulfide, polypyrrole, polyaniline, polythiophene, polyparastyrene, polyacetylene, or polyacene or the like.

The solid electrolyte is the same as that contained in the above-described solid electrolyte layer 5. However, the compositions (types of materials) or composition ratios of the solid electrolytes contained in the solid electrolyte layer 5 and the positive electrode active material layer 3a may be the same or different.

The conductive agent is, for example, at least one of a carbon material, metal, metal oxide, and a conductive polymer and the like. As the carbon material, for example, at least one of graphite, carbon fiber, carbon black, and carbon nanotube and the like can be used. As the carbon fiber, for example, vapor growth carbon fiber (VGCF (registered trademark)) or the like can be used. As the carbon black, for example, at least one of acetylene black and ketjen black and the like can be used. As the carbon nanotube, for example, single wall carbon nanotube (SWCNT) and multi-wall carbon nanotube (MWCNT) such as double wall carbon nanotube (DWCNT) and the like can be used. As the metal, for example, Ni powder and the like can be used. As the metal oxide, for example, $SnO_2$ and the like can be used. As the conductive polymer, for example, at least one of substituted or unsubstituted polyaniline, polypyrrole, polythiophene, and (co) polymers of one or two selected from these can be used. The conductive agent may be a material having a conductivity, and is not limited to the above-described example.

(Negative Electrode Layer)

The negative electrode layer 4 contains a negative electrode active material and a solid electrolyte. The solid electrolyte may have a function as a binder. In the first embodiment, the conductivity of the negative electrode active material is high, and the negative electrode active material layer also serves as a negative electrode current collecting layer. When a material having a low conductivity is used for the negative electrode active material, the negative electrode current collecting layer must be disposed. A conductive material may be mixed in the negative electrode active material layer. The negative electrode current collecting layer may be disposed separately from the active material layer. The negative electrode layer 4 is, for example, a green sheet sintered body as a negative electrode layer precursor.

The negative electrode active material contains, for example, a negative electrode material capable of occluding and releasing lithium ions which are an electrode reactant. From the viewpoint of obtaining a high energy density, the negative electrode material is preferably a carbon material or a metal-based material or the like, but it is not limited thereto.

The carbon material is, for example, graphitizable carbon, non-graphitizable carbon, graphite, mesocarbon microbeads (MCMB), or highly oriented graphite (HOPG) or the like.

The metal-based material is, for example, a material containing a metal element or a metalloid element capable of forming an alloy with lithium as a constituent element. More specifically, examples of the metal-based material include a simple substance such as silicon (Si), tin (Sn), aluminum (Al), indium (In), magnesium (Mg), boron (B), gallium (Ga), germanium (Ge), lead (Pb), bismuth (Bi), cadmium (Cd), silver (Ag), zinc (Zn), hafnium (Hf), zirconium (Zr), yttrium (Y), palladium (Pd), or platinum (Pt), and one or two or more of alloys or compounds. However, the simple substance is not limited to the purity of 100%, and may contain a trace amount of impurities. Examples of the alloy or the compound include $SiB_4$, $TiSi_2$, SiC, $Si_3N_4$, $SiO_v$ (0<v≤2), LiSiO, $SnO_w$ (0<w≤2), $SnSiO_3$, LiSnO, and $Mg_2Sn$.

The metal-based material may be a lithium-containing compound or lithium metal (simple substance of lithium). The lithium-containing compound is composite oxide (lithium transition metal composite oxide) containing lithium and a transition metal element as constituent elements. Examples of the composite oxide include $Li_4Ti_5O_{12}$.

The solid electrolyte is the same as that contained in the above-described solid electrolyte layer 5. However, the compositions (types of materials) or composition ratios of the solid electrolytes contained in the solid electrolyte layer 5 and the negative electrode layer 4 may be the same or different.

The conductive agent is the same as that in the above-described positive electrode active material layer 3a.

(Barrier Layer)

Figure 2:
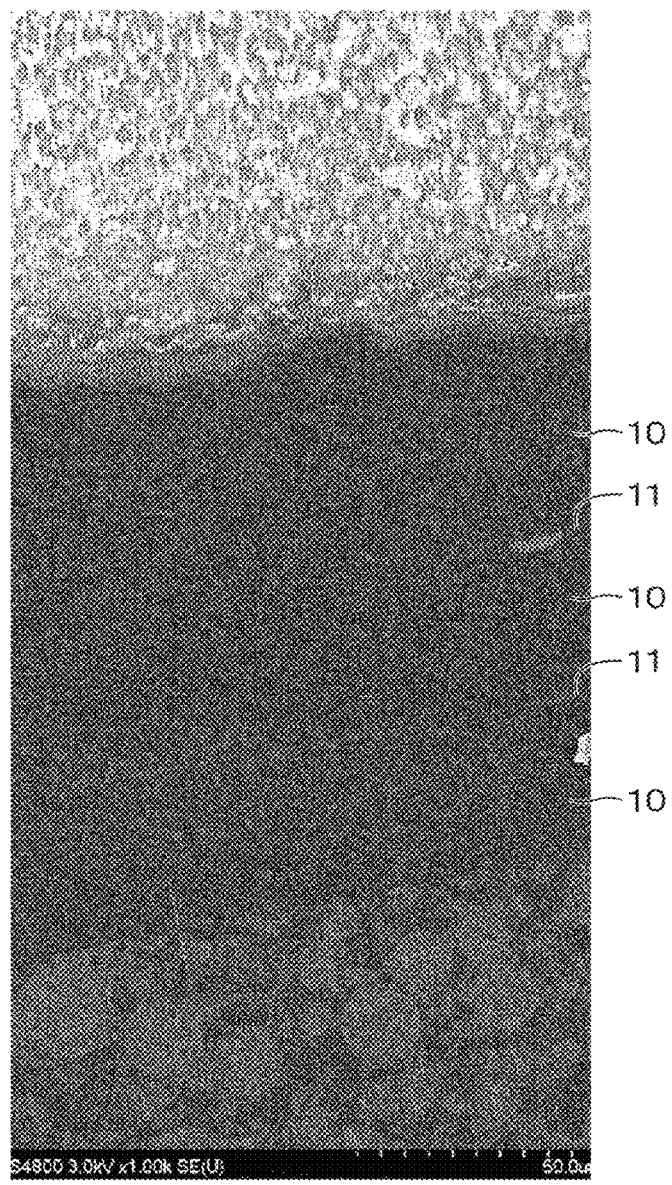
FIG. 2 is a scanning electron microscope image of a section for illustrating the all-solid-state battery according to the first embodiment of the present technology.

The barrier layer 11 is composed of, for example, a thin nitride film or oxynitride film. The nitride film and the oxynitride film are preferably composed of silicon or aluminum, and the nitride film and the oxynitride film are more preferably composed of silicon nitride (SiNt) and silicon oxynitride (SiNtOu), respectively. Here, t and u are numerical values greater than 0. Deformation due to an external force is apt to cause peeling or crack to occur in the silicon nitride film, so that it is more preferable to use a silicon oxynitride film which is more resistant to deformation. If the ratio of oxygen in the silicon oxynitride film is high (the value of u is high), the silicon oxynitride film disadvantageously has a low barrier property against moisture. It is more preferable that the barrier layer 11 is a silicon oxynitride film in which the ratio of oxygen is kept low (the value of u is set low) and the light refractive index is 1.7 or more. If the thickness of the silicon oxynitride film is increased, the elasticity is disadvantageously deteriorated. When the silicon oxynitride film is used for the barrier layer 11, the film thickness is more preferably set to about 1 μm, as illustrated in a SEM (scanning electron microscope) image of FIG. 2. However, the barrier layer is not limited to the exemplified silicon oxynitride film as long as it has a high barrier property against moisture and has a certain degree of elasticity.

In FIG. 1, two barrier layers 11 are disposed. The two barrier layers 11 are provided by considering the possibility that defect portions such as pinholes are rarely formed in the barrier layers 11 during a preparing process, and the possibility that peeling or crack occurs in one of the layers during charge and discharge. In the present Examples, the number of the barrier layers 11 is 2, but it is not limited thereto. The number of the barrier layers 11 may be 1 or 3 or more.

(Buffer Layer)

When the battery repeatedly expands and contracts during charge and discharge, and the silicon oxynitride film is used as the barrier layer 11, peeling or crack may occur in the barrier layer 11. At this time, if a material having a cushiony buffering effect is adjacent to the periphery (particularly the inner side) of the barrier layer, the material having a buffering effect is deformed (expands and contracts) by an amount corresponding to the deformation (contraction/expansion) of the battery, so that the deformation of the barrier layer can be suppressed, to prevent the occurrence of peeling or crack in the barrier layer. The cushiony buffering effect can be realized by a flexible and elastic porous material having a sponge structure. The buffer layer 10 contains, for example, polyimide silicone (PIS). The material of the buffer layer 10 is not limited to PIS as long as it has the cushiony buffering effect. The buffer layers 10 are disposed inside and outside the barrier layer 11 so as to cover the barrier layer 11. In FIG. 1, the buffer layer 10 is disposed outside the outer barrier layer 11, but the buffer layer 10 only needs to be provided inside the barrier layer 11, so that the outermost buffer layer 10 may not be provided.

(Impact-Resistant Layer)

No special measures are taken against external physical impact for the inside of the all-solid-state battery of the first embodiment, so that a member for protecting the inside of the battery from physical impact is required. Therefore, an impact-resistant layer is disposed outside the battery. The protection from the physical impact may be provided by a member having a strength preventing the impact from passing therethrough, or a member absorbing or diffusing the impact to prevent the impact from passing therethrough. The impact-resistant layer 12 contains, for example, a mixture of an epoxy resin and silica. The impact-resistant layer 12 is not limited thereto as long as it has a certain level of strength. By adding carbon in an amount causing no conductivity to the impact-resistant layer 12, the impact-resistant layer 12 can be colored black.

(Internal Electrode and External Electrode)

The internal electrode 8 and the external electrode 13 contain, for example, a silver paste. The internal electrode 8 and the external electrode 13 may contain a silver-containing epoxy resin, and are not limited thereto as long as the electrodes have a good conductivity. The reason why a Ni plating layer 14 and a Sn plating layer 15 are interposed between the external electrode 13 and the solder coating 16 is that, for example, deterioration in the conductivity of the external electrode 13 due to the movement of silver to the solder coating is prevented when a silver paste is used for the external electrode 13. The metal wire 9 electrically connected to the internal electrode 8 functions as an electrode extraction part.

(One Example of Method for Preparing All-Solid-State Battery)

Figure 3:
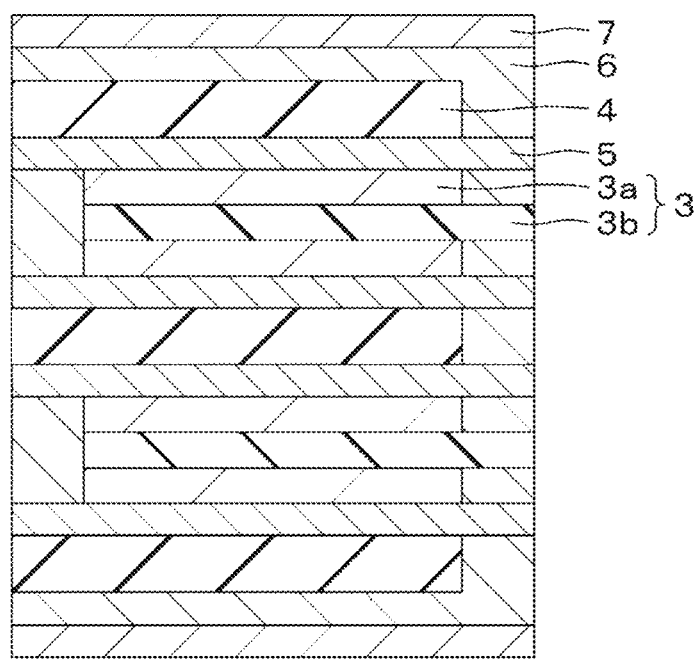
FIG. 3 is a sectional view for illustrating an example of a preparing process of the all-solid-state battery according to the first embodiment of the present technology.
Figure 4:
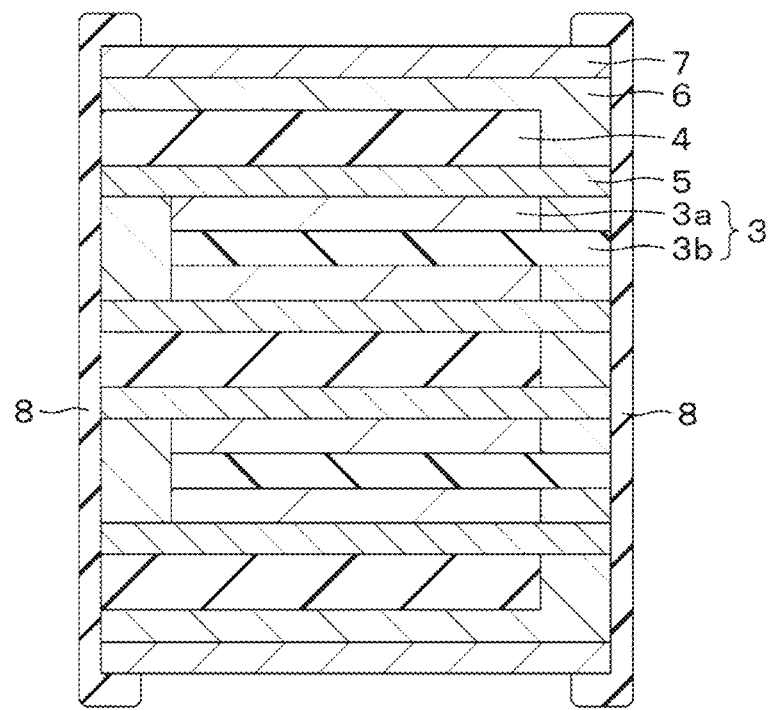
FIG. 4 is a sectional view for illustrating an example of a preparing process of the all-solid-state battery according to the first embodiment of the present technology.
Figure 5:
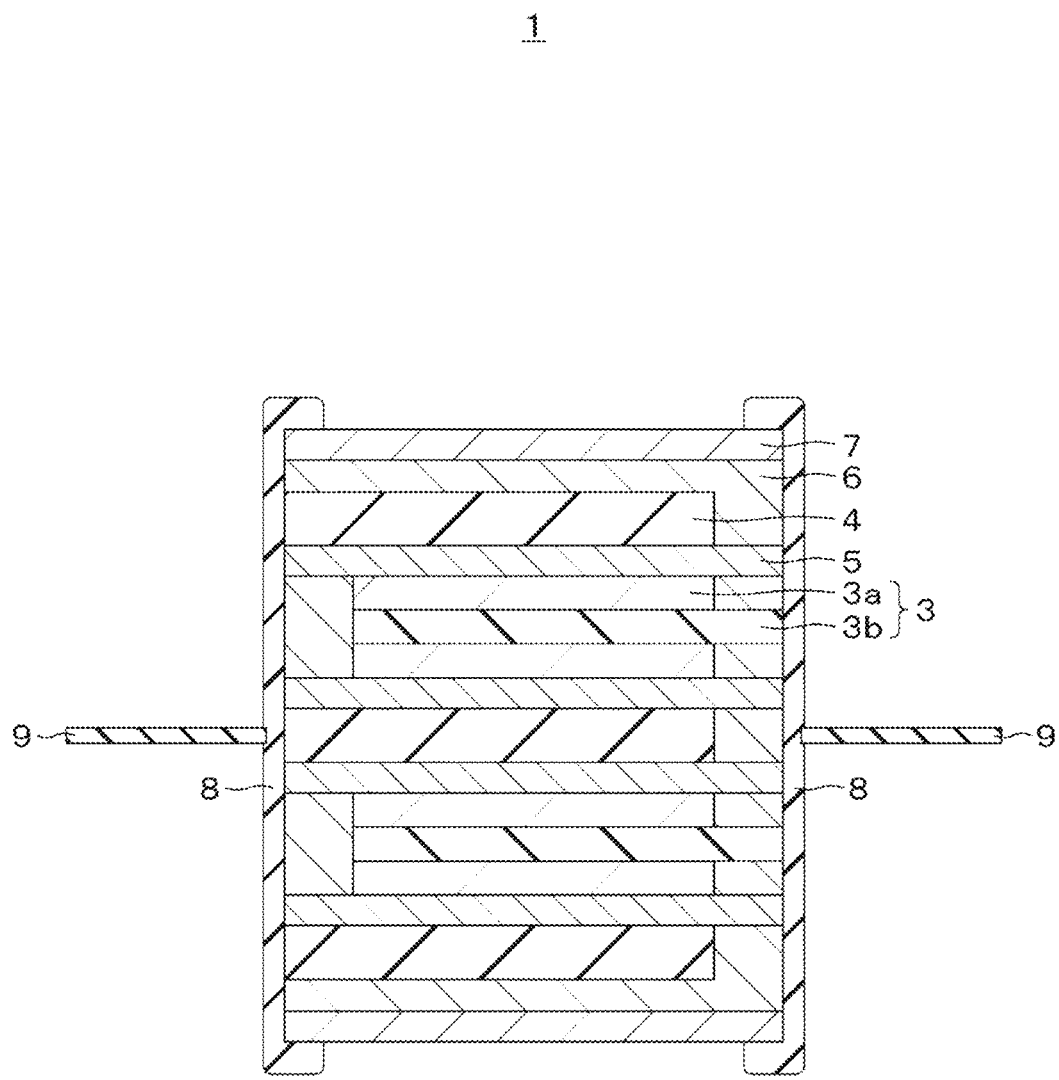
FIG. 5 is a sectional view for illustrating an example of a preparing process of the all-solid-state battery according to the first embodiment of the present technology.
Figure 6:
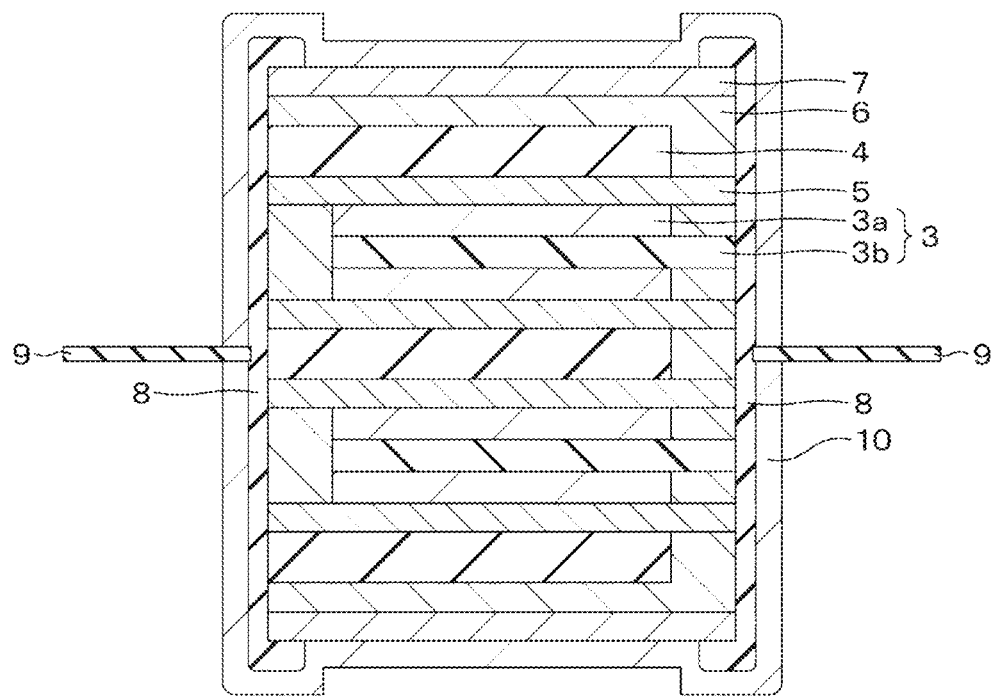
FIG. 6 is a sectional view for illustrating an example of a preparing process of the all-solid-state battery according to the first embodiment of the present technology.
Figure 7:
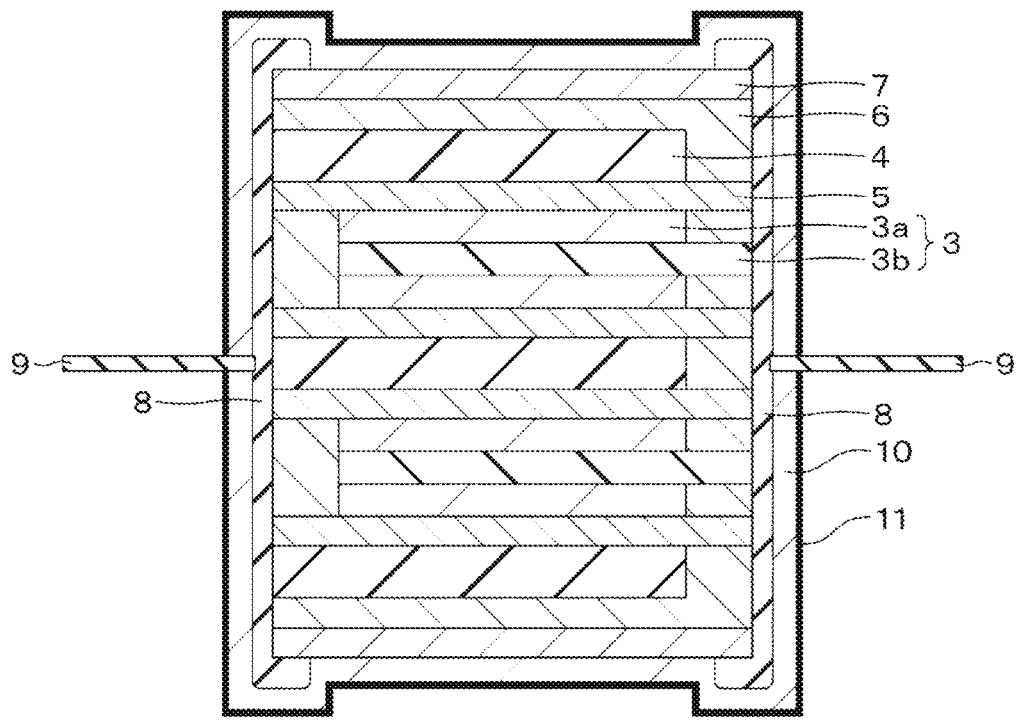
FIG. 7 is a sectional view for illustrating an example of a preparing process of the all-solid-state battery according to the first embodiment of the present technology.
Figure 8:
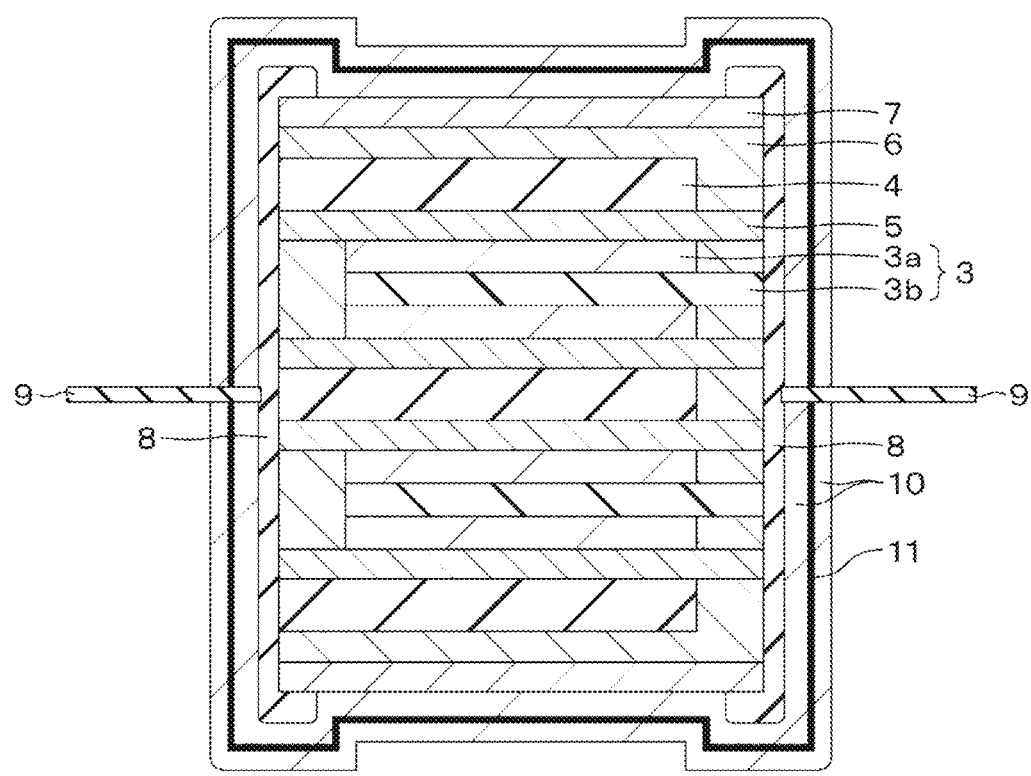
FIG. 8 is a sectional view for illustrating an example of a preparing process of the all-solid-state battery according to the first embodiment of the present technology.
Figure 9:
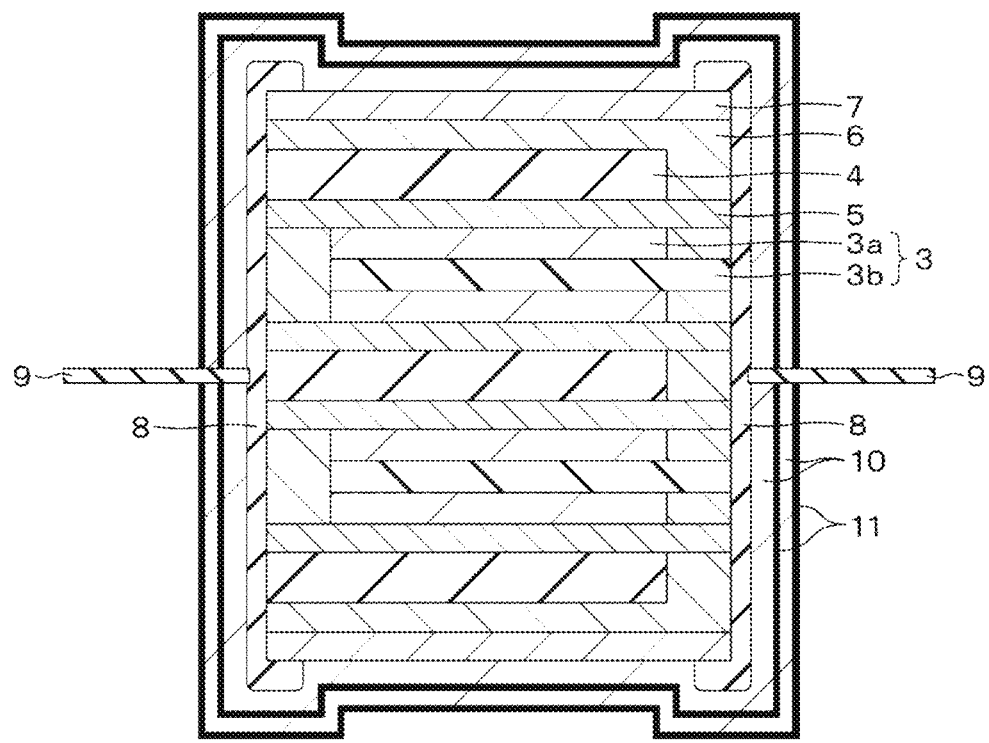
FIG. 9 is a sectional view for illustrating an example of a preparing process of the all-solid-state battery according to the first embodiment of the present technology.
Figure 10:
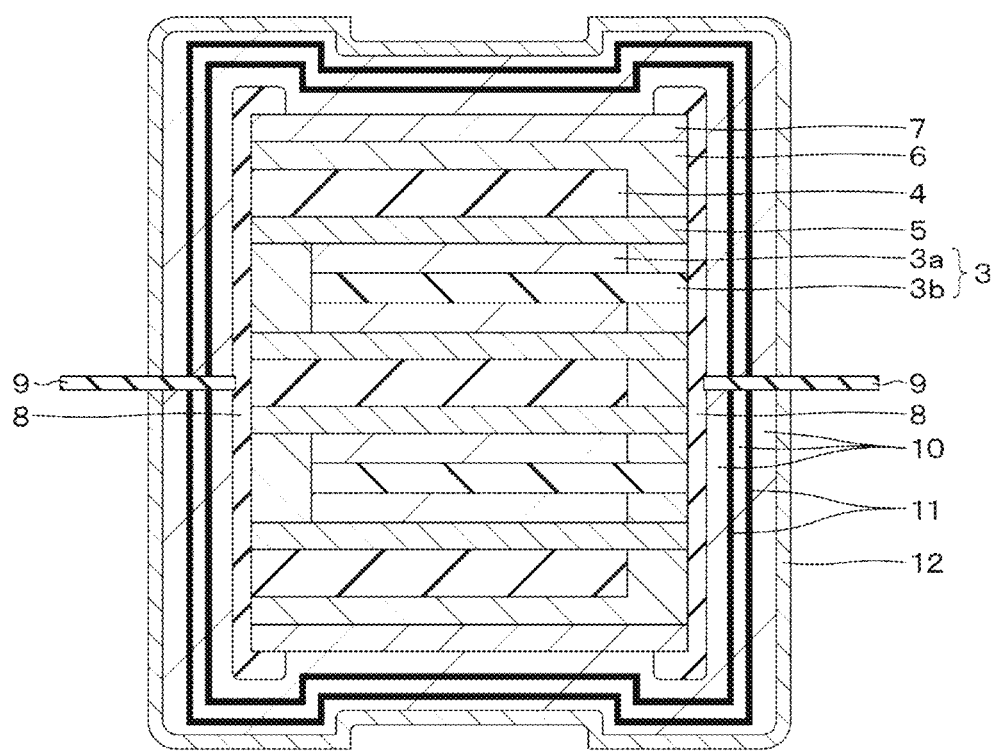
FIG. 10 is a sectional view for illustrating an example of a preparing process of the all-solid-state battery according to the first embodiment of the present technology.
Figure 11:
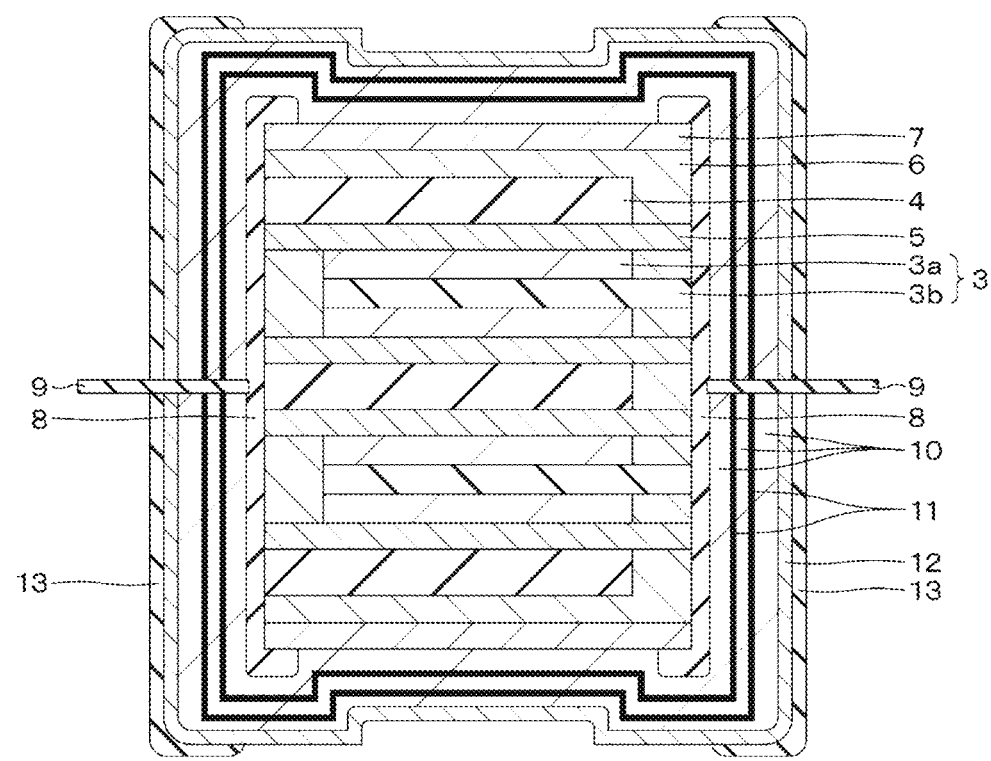
FIG. 11 is a sectional view for illustrating an example of a preparing process of the all-solid-state battery according to the first embodiment of the present technology.
Figure 12:
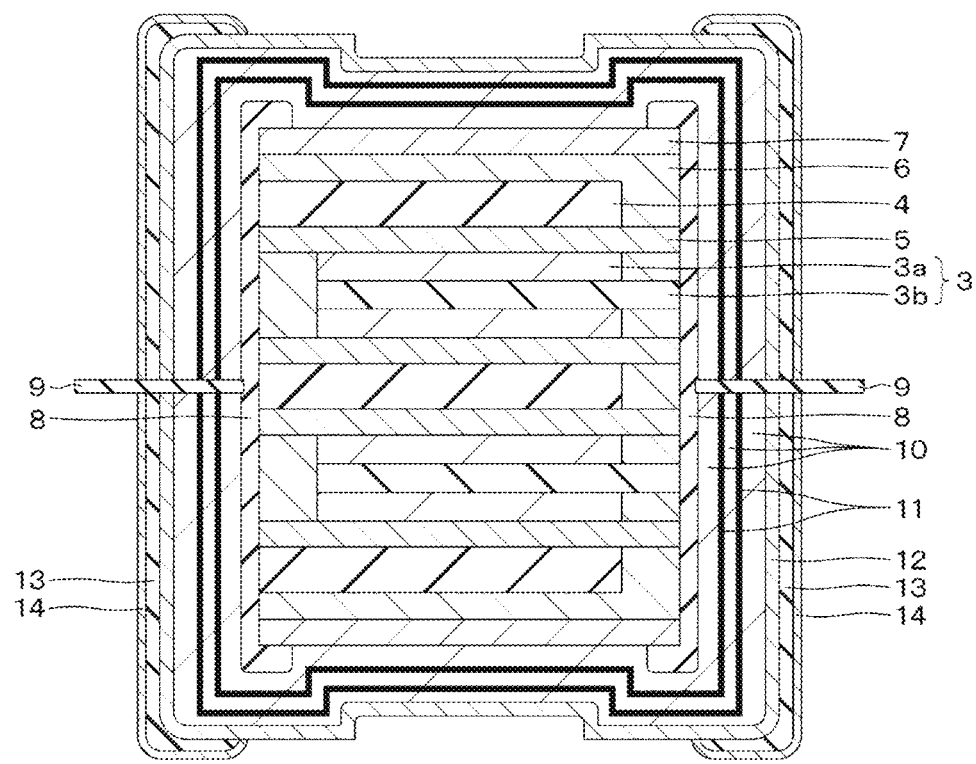
FIG. 12 is a sectional view for illustrating an example of a preparing process of the all-solid-state battery according to the first embodiment of the present technology.
Figure 13:
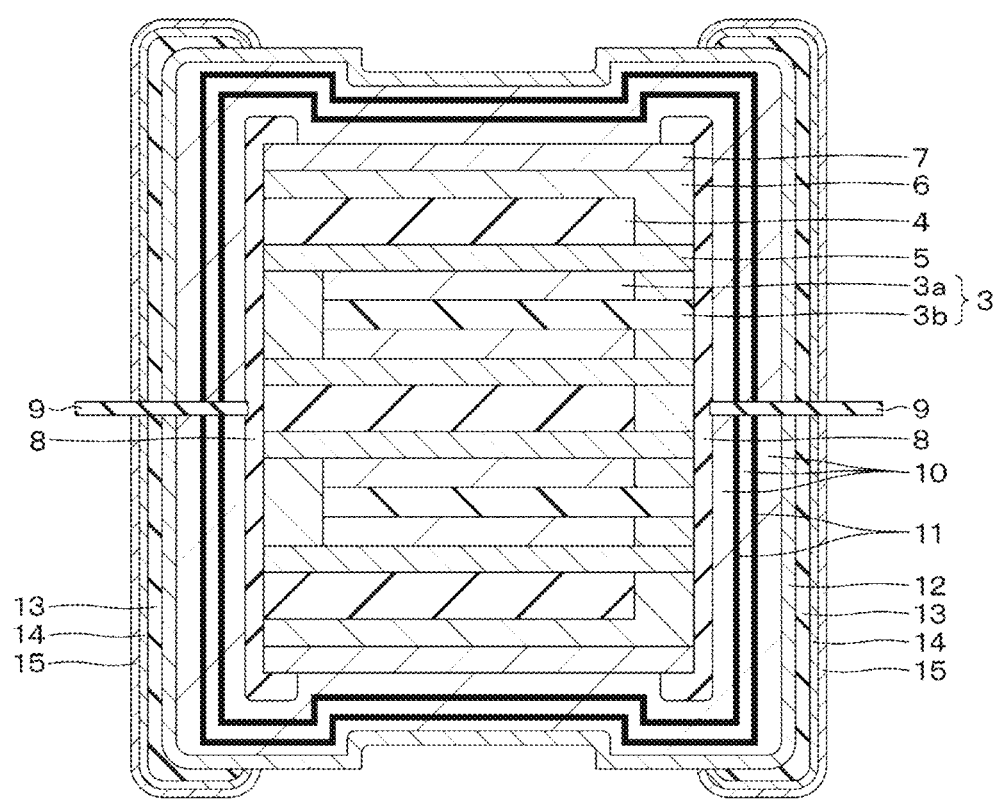
FIG. 13 is a sectional view for illustrating an example of a preparing process of the all-solid-state battery according to the first embodiment of the present technology.
Figure 14:
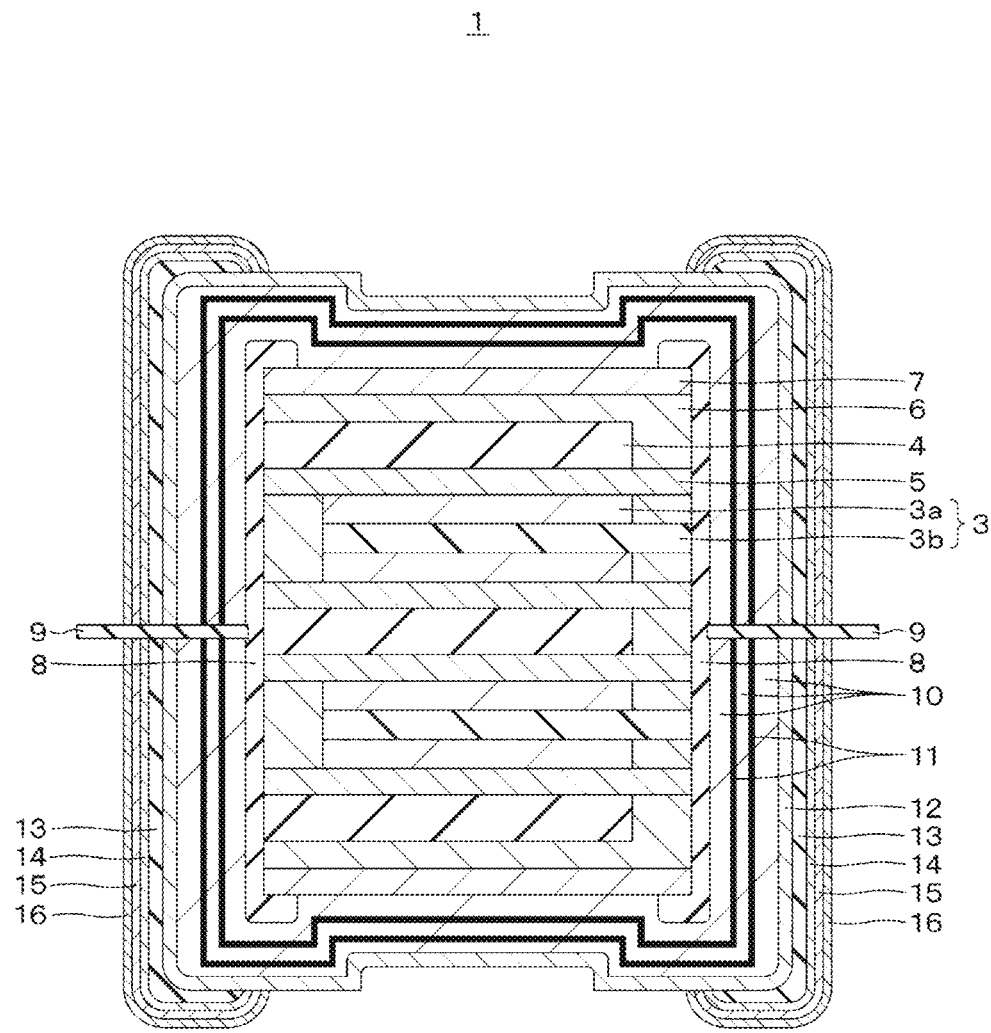
FIG. 14 is a sectional view for illustrating an example of a preparing process of the all-solid-state battery according to the first embodiment of the present technology.

As illustrated in FIG. 3, a positive electrode layer 3 (positive electrode active material layer 3a and positive electrode current collecting layer 3b) and a negative electrode layer 4 were stacked with a solid electrolyte 5 interposed therebetween, and the periphery of the stacked product was partially covered by a separation layer 6. A protective layer 7 was stacked on the main surface of the separation layer 6, and an all-solid-state battery of FIG. 3 was fired at a high temperature while the all-solid-state battery was pressed from the main surface of the protective layer 7 by a plate-shaped object. A silver paste was applied to a part of the all-solid-state battery of FIG. 3, and then heated to prepare an internal electrode 8 on each of side surfaces of the positive electrode layer 3 and the negative electrode layer 4, as illustrated in FIG. 4. As illustrated in FIG. 5, a metal wire 9 was attached and electrically connected to the internal electrode 8. By applying PIS to the all-solid-state battery of FIG. 5 and heating the PIS, a buffer layer 10 was prepared as illustrated in FIG. 6. Polysilazane was applied to the all-solid-state battery of FIG. 6, dried, and then irradiated with ultraviolet rays, to prepare a barrier layer 11 (silicon oxynitride film) as illustrated in FIG. 7. The barrier layer 11 can be prepared not only by an applying method but also by a chemical vapor deposition (CVD) method. By repeating these, an all-solid-state battery as illustrated in FIGS. 8 and 9 was obtained. A buffer layer 10 was similarly prepared once again on the all-solid-state battery of FIG. 9. A silica-containing epoxy resin was then applied to the buffer layer 10, and heated to prepare an impact-resistant layer 12 as illustrated in FIG. 10. An external electrode as illustrated in FIG. 11 was prepared by applying a silver paste to a part of the all-solid-state battery of FIG. 10 and heating the silver paste. Thereafter, as illustrated in FIGS. 12 and 13, a Ni plating layer 14 and a Sn plating layer 15 were prepared by electroplating, and a solder coating 16 was prepared as illustrated in FIG. 14.

2. Second Embodiment

"All-Solid-State Battery"

An all-solid-state battery according to a second embodiment has basically the same structure as that of the all-solid-state battery according to the first embodiment, but it includes an electrode extraction part having a different shape and the like.

"Configuration of Battery"

Figure 15:
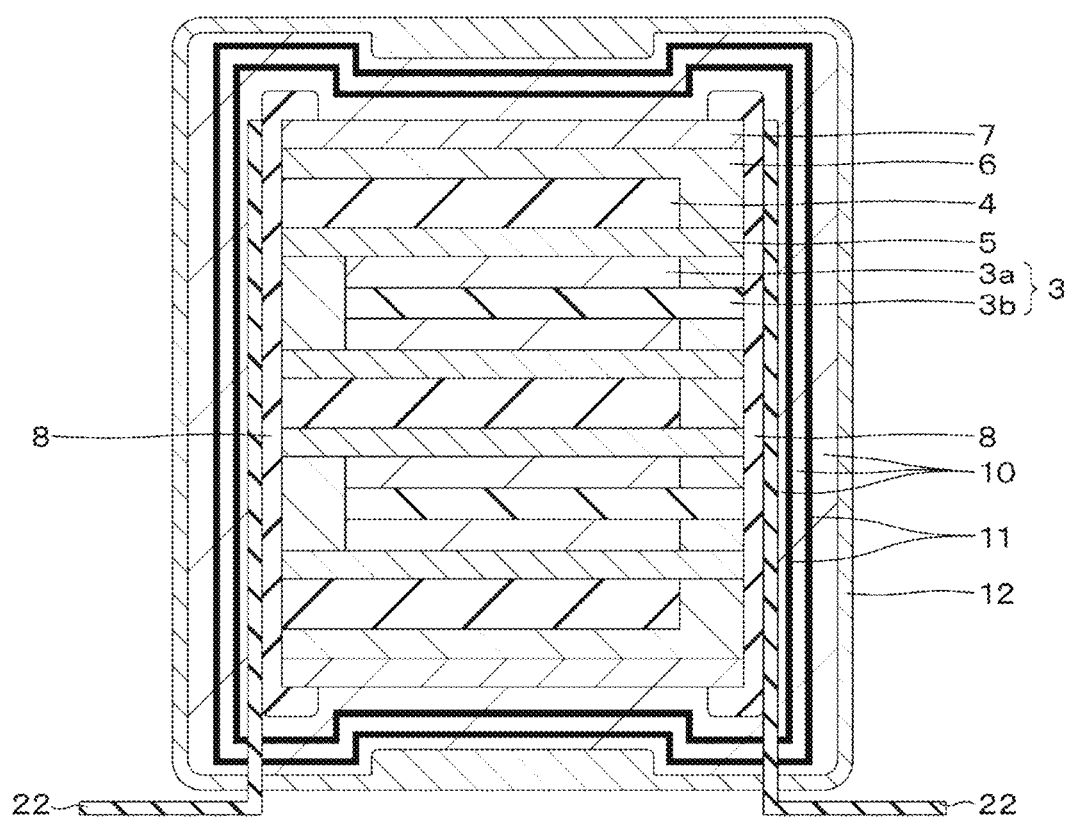
FIG. 15 is a sectional view for illustrating an all-solid-state battery according to a second embodiment of the present technology.

FIG. 15 is a sectional view illustrating the configuration of the all-solid-state battery according to the second embodiment.

An all-solid-state battery 21 includes a solid electrolyte layer 5, a positive electrode layer 3 (positive electrode active material layer 3a and positive electrode current collecting layer 3b), and a negative electrode layer 4 as a central portion, as in the first embodiment. The periphery of these layers is partially covered by a separation layer 6 and a protective layer 7, and an internal electrode 8 is disposed on each of side surfaces of the positive electrode layer 3 and the negative electrode layer 4. A metal plate 22 is electrically connected to the internal electrode 8, and the metal plate 22 extends in a direction substantially parallel to the internal electrode 8. An extending portion of the metal plate 22 is bent outward in a substantially L-shape. As in Example 1, the whole of the internal electrode 8 and a part of the metal plate 22 are alternately covered by a buffer layer 10 and a barrier layer 11, and the outside thereof and a part of a metal wire 9 are covered by an impact-resistant layer 12. Unlike the first embodiment, the all-solid-state battery according to the second embodiment does not include a Ni plating layer, a Sn plating layer, and a solder coating. Since the members of the all-solid-state battery according to the second embodiment are the same as those in the first embodiment, the descriptions of materials and quality of materials and the like will be omitted. In the all-solid-state battery according to the second embodiment illustrated in FIG. 15, a power storage part includes two positive electrode layers 3 and three negative electrode layers 4, but the number of the positive electrode layers 3 and the number of the negative electrode layers 4 may be 1, and may be plural other than the above.

(One Example of Method for Preparing All-Solid-State Battery)

Figure 16:
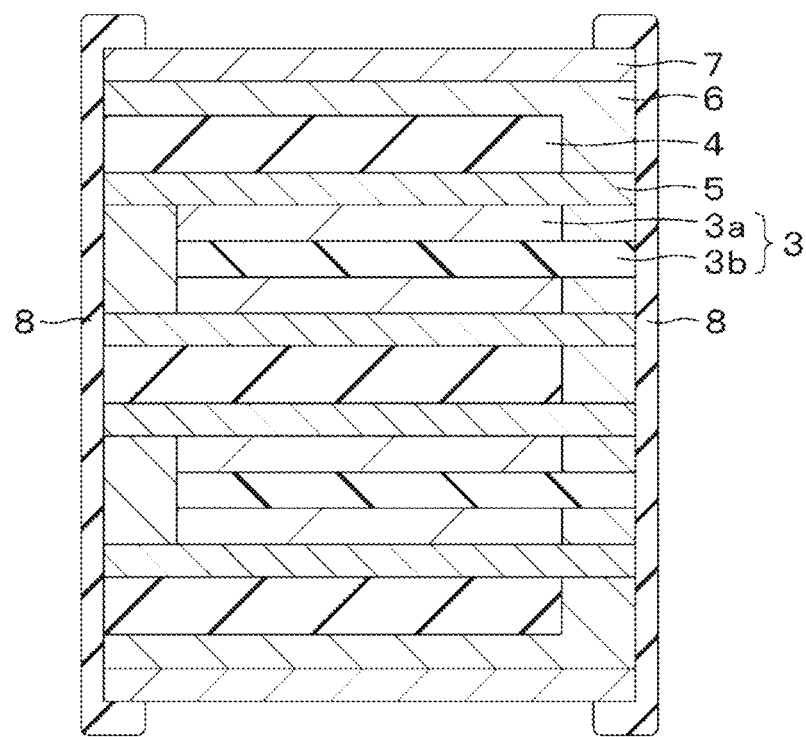
FIG. 16 is a sectional view for illustrating an example of a preparing process of the all-solid-state battery according to the second embodiment of the present technology.
Figure 17:
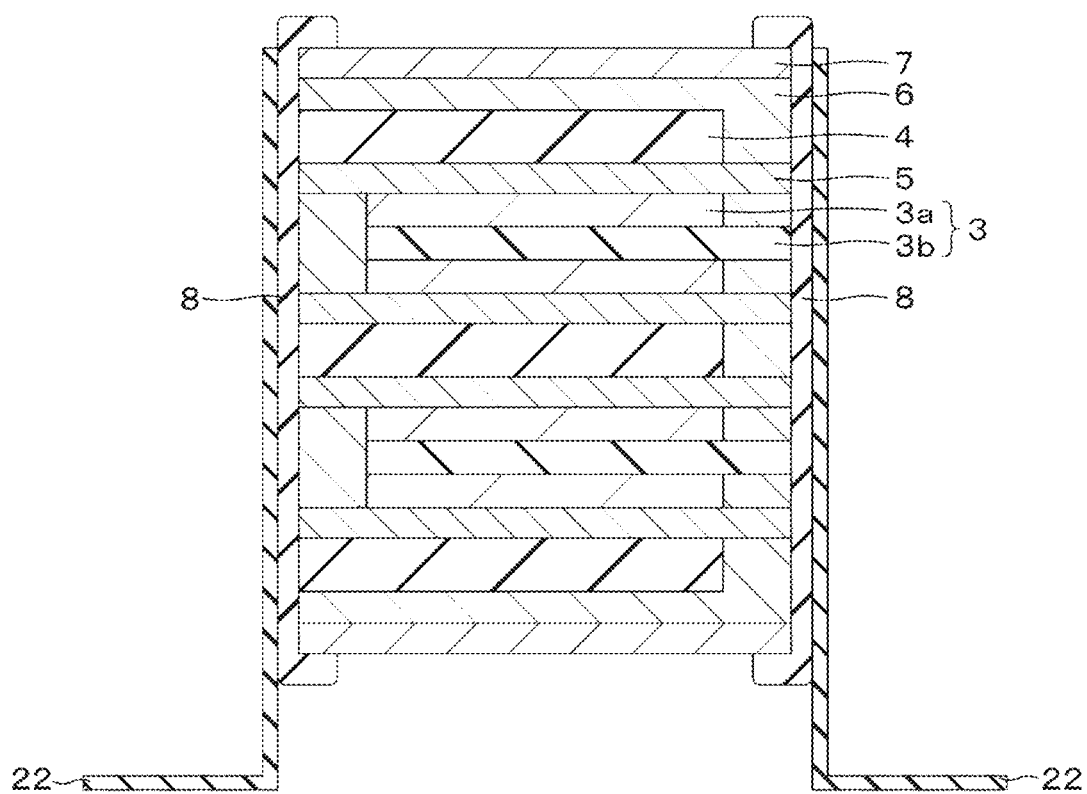
FIG. 17 is a sectional view for illustrating an example of a preparing process of the all-solid-state battery according to the second embodiment of the present technology.
Figure 18:
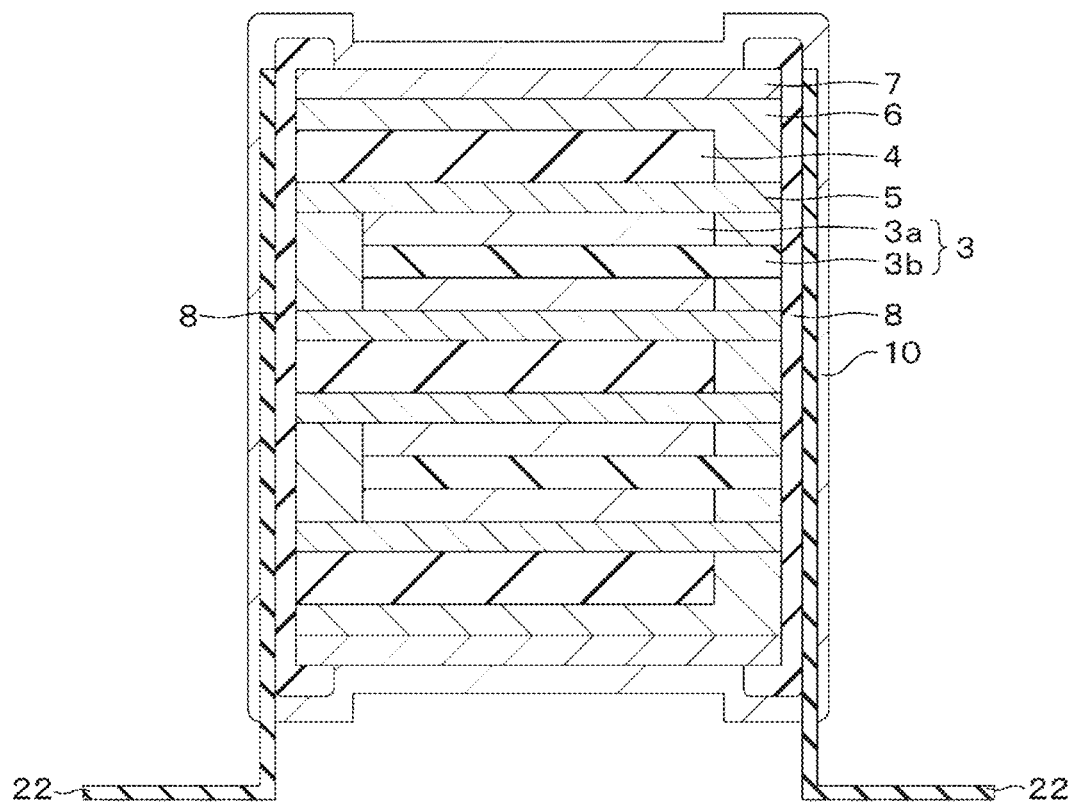
FIG. 18 is a sectional view for illustrating an example of a preparing process of the all-solid-state battery according to the second embodiment of the present technology.
Figure 19:
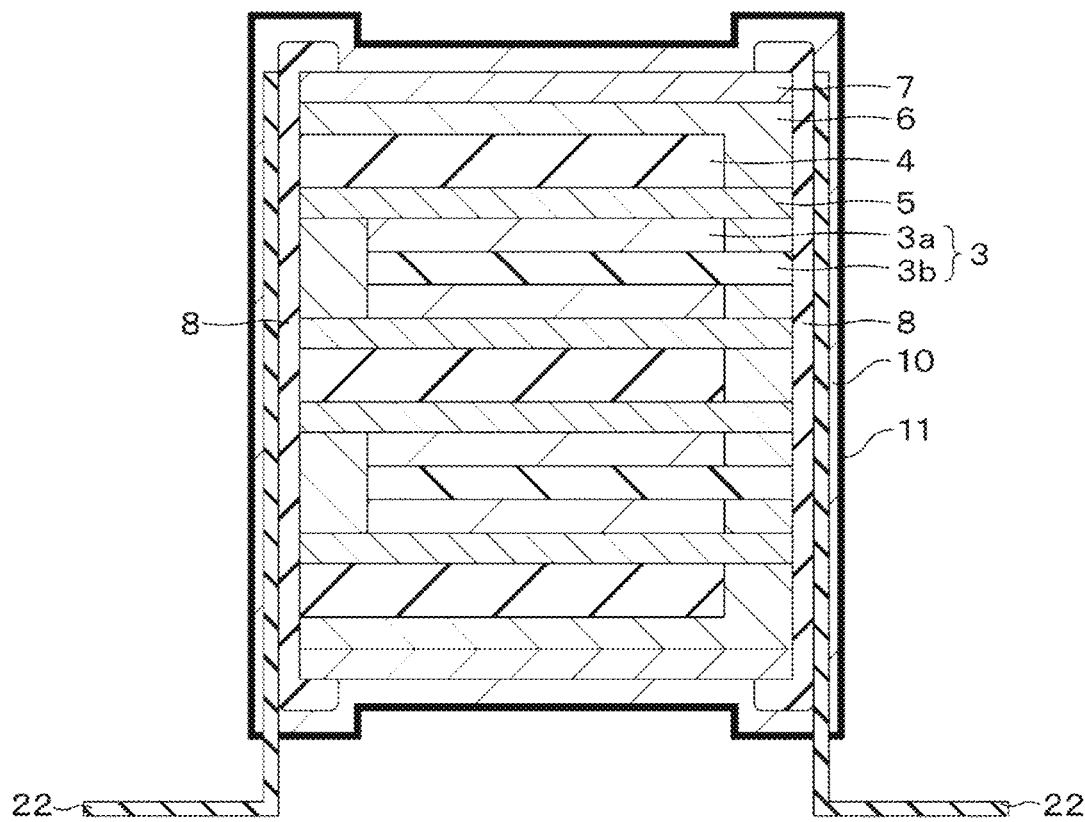
FIG. 19 is a sectional view for illustrating an example of a preparing process of the all-solid-state battery according to the second embodiment of the present technology.
Figure 20:
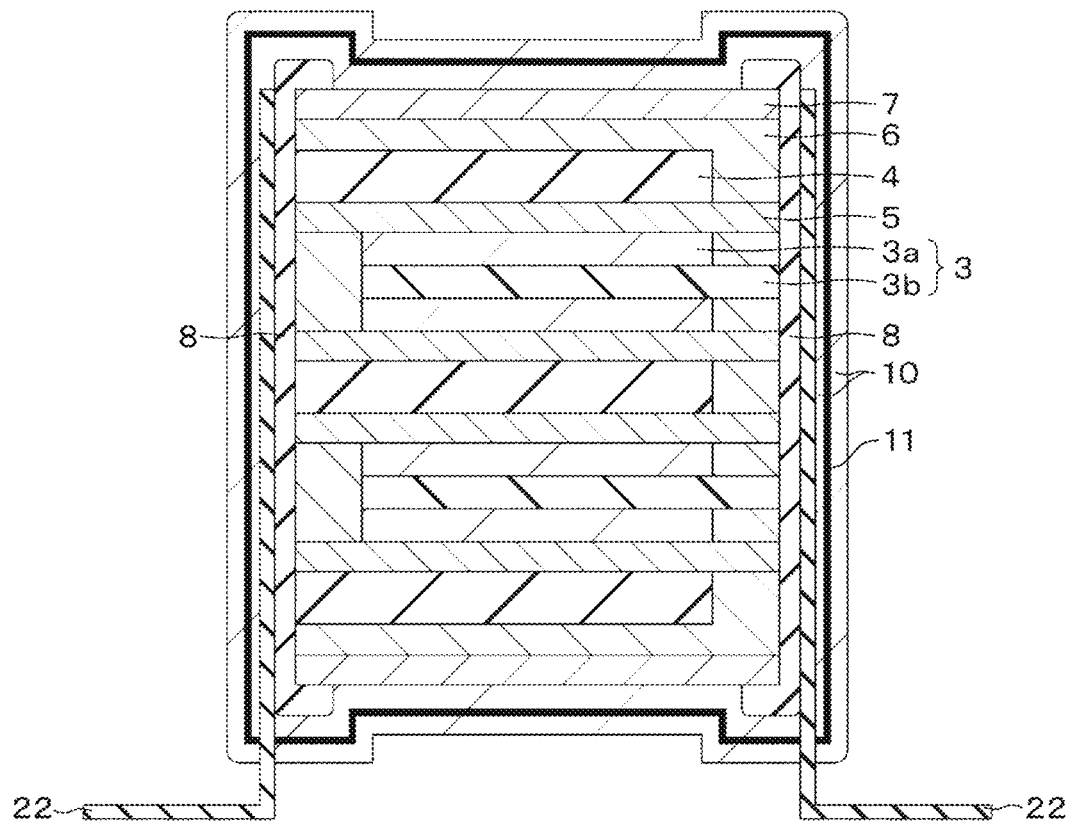
FIG. 20 is a sectional view for illustrating an example of a preparing process of the all-solid-state battery according to the second embodiment of the present technology.
Figure 21:
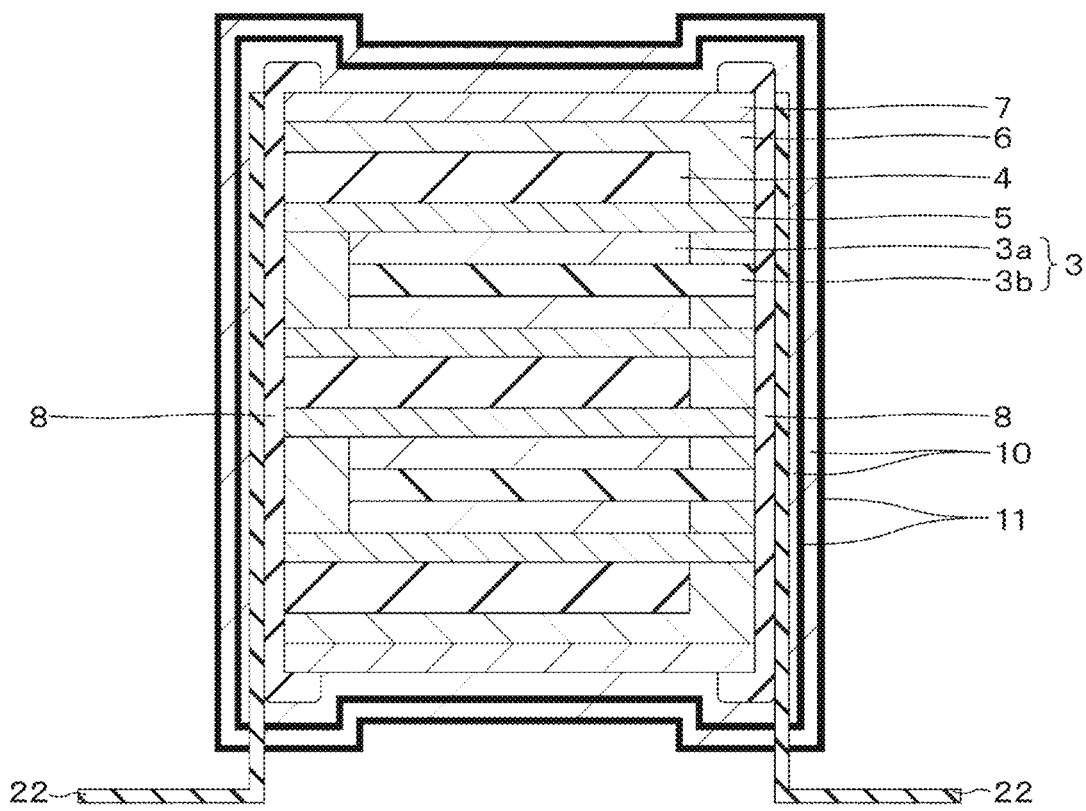
FIG. 21 is a sectional view for illustrating an example of a preparing process of the all-solid-state battery according to the second embodiment of the present technology.
Figure 22:
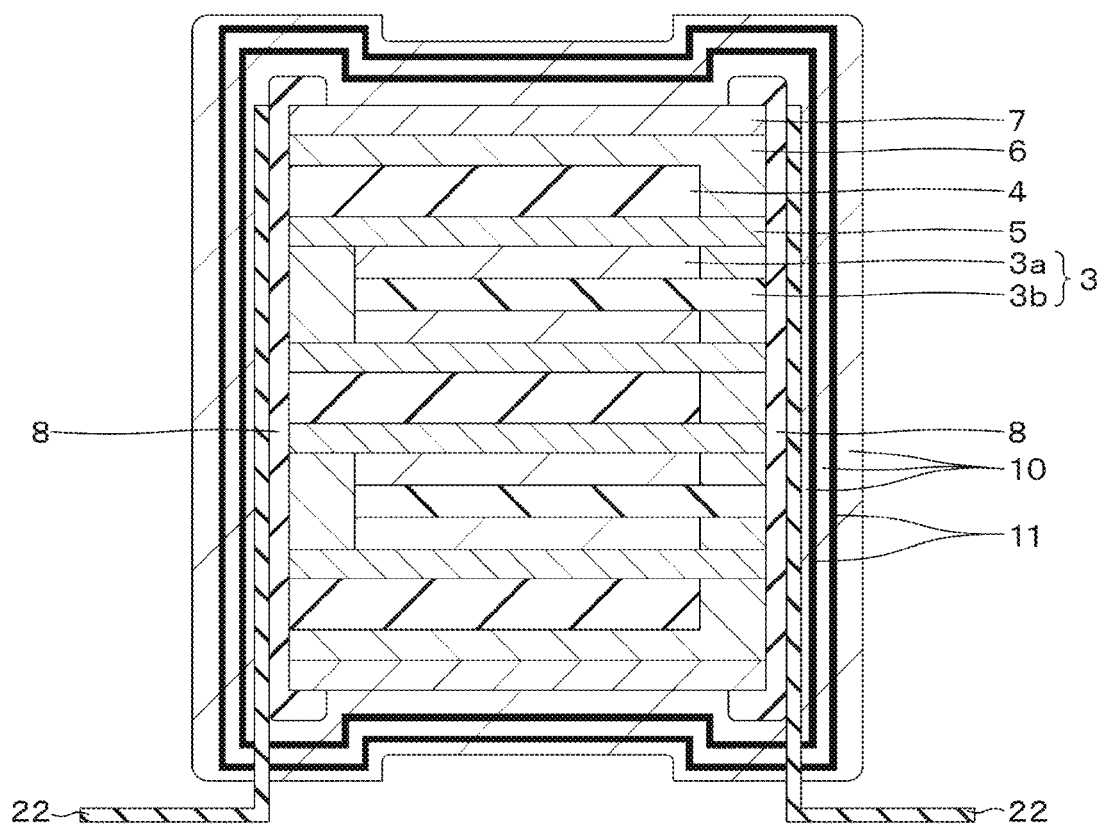
FIG. 22 is a sectional view for illustrating an example of a preparing process of the all-solid-state battery according to the second embodiment of the present technology.
Figure 23:
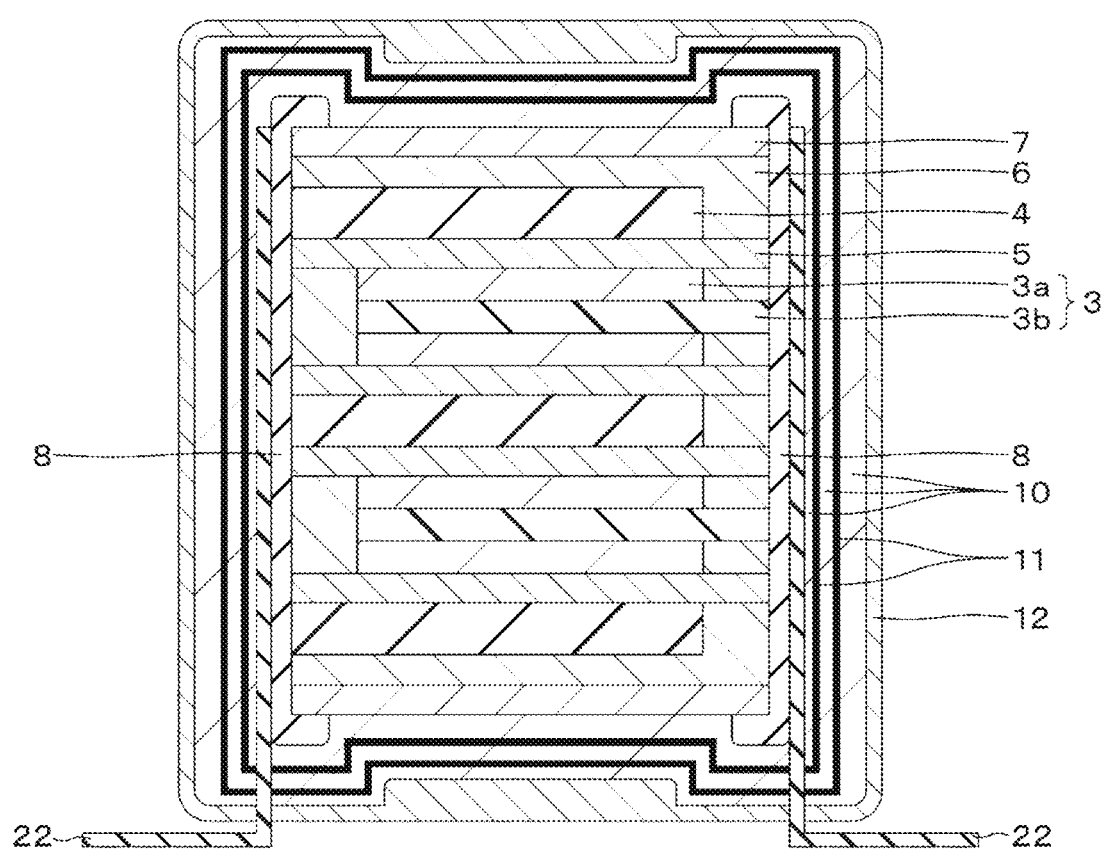
FIG. 23 is a sectional view for illustrating an example of a preparing process of the all-solid-state battery according to the second embodiment of the present technology.

As in the case of FIG. 4 in the first embodiment, an all-solid-state battery as illustrated in FIG. 16 was prepared. As illustrated in FIG. 17, a metal plate 22 was attached to an internal electrode 8 to be electrically connected. As in the first embodiment, a buffer layer 10 as illustrated in FIG. 18 was prepared by applying PIS to the all-solid-state battery of FIG. 17. Then, polysilazane was applied to the all-solid-state battery of FIG. 18, dried, and then irradiated with ultraviolet rays to prepare a barrier layer 11 (silicon oxynitride film) as illustrated in FIG. 19. As in the first embodiment, by repeating these, an all-solid-state battery as illustrated in FIGS. 20, 21, and 22 was prepared. A silica-containing epoxy resin was applied to the all-solid-state battery of FIG. 22 to prepare an impact-resistant layer 12 as illustrated in FIG. 23.

3. Third Embodiment

"All-Solid-State Battery"

A third embodiment relates to an all-solid-state battery including a barrier layer as in the first embodiment, for example, to an all-solid-state battery in which an electric circuit necessary for controlling the charge and discharge of the battery is included. The barrier layer has a role of preventing the ingression of moisture into the battery, and also has a role of preventing Li from diffusing out of the battery. If Li adheres to the electric circuit, malfunction occurs, so that a conventional battery structure including no barrier layer makes it impossible to mount the electric circuit on the surface of the battery. However, in the third embodiment in which the barrier layer is disposed, by disposing the electric circuit in the vicinity of the barrier layer, the all-solid-state battery and the electric circuit can be integrally formed. The all-solid-state battery of the third embodiment can be heated to a relatively high temperature, so that, for example, the all-solid-state battery in which the electric circuit is disposed can be placed in a reflow furnace for heating when elements and the like are soldered on the electric circuit.

In the existing technologies, a charging circuit and the like has been mounted on a printed circuit board to connect an all-solid-state battery and a battery to each other. For example, a charge/discharge control integrated circuit (IC), a battery protection IC, a battery remaining amount monitoring IC, and a universal serial bus (USB) interface and the like have been mounted on the printed circuit board together with the all-solid-state battery. Meanwhile, in the third embodiment, the charge/discharge control IC and the like can be disposed in the vicinity of the barrier layer for the all-solid-state battery.

"Configuration of Battery"

Figure 24:
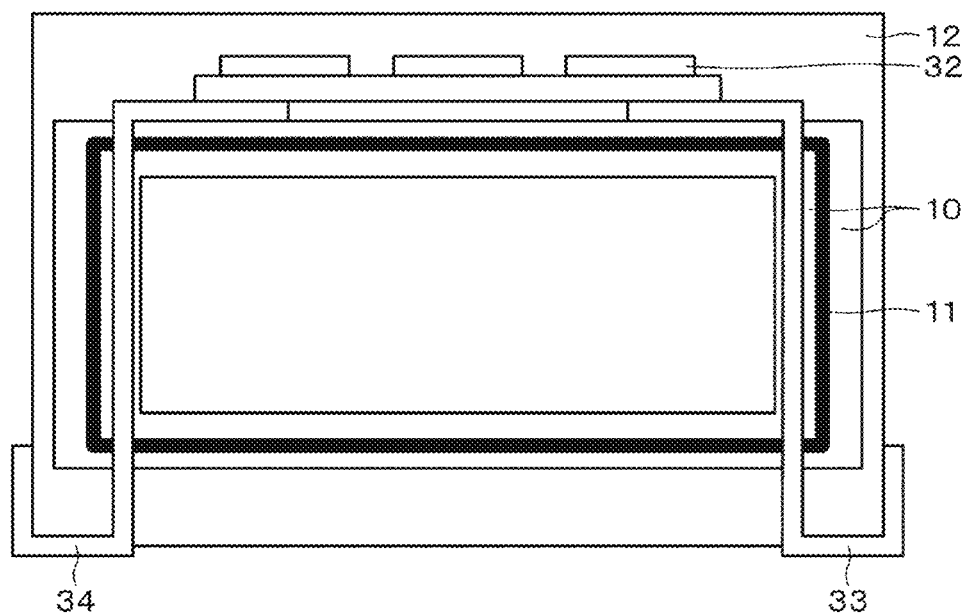
FIG. 24 is a sectional view for illustrating an example of a preparing process of an all-solid-state battery according to a third embodiment of the present technology.
Figure 25:
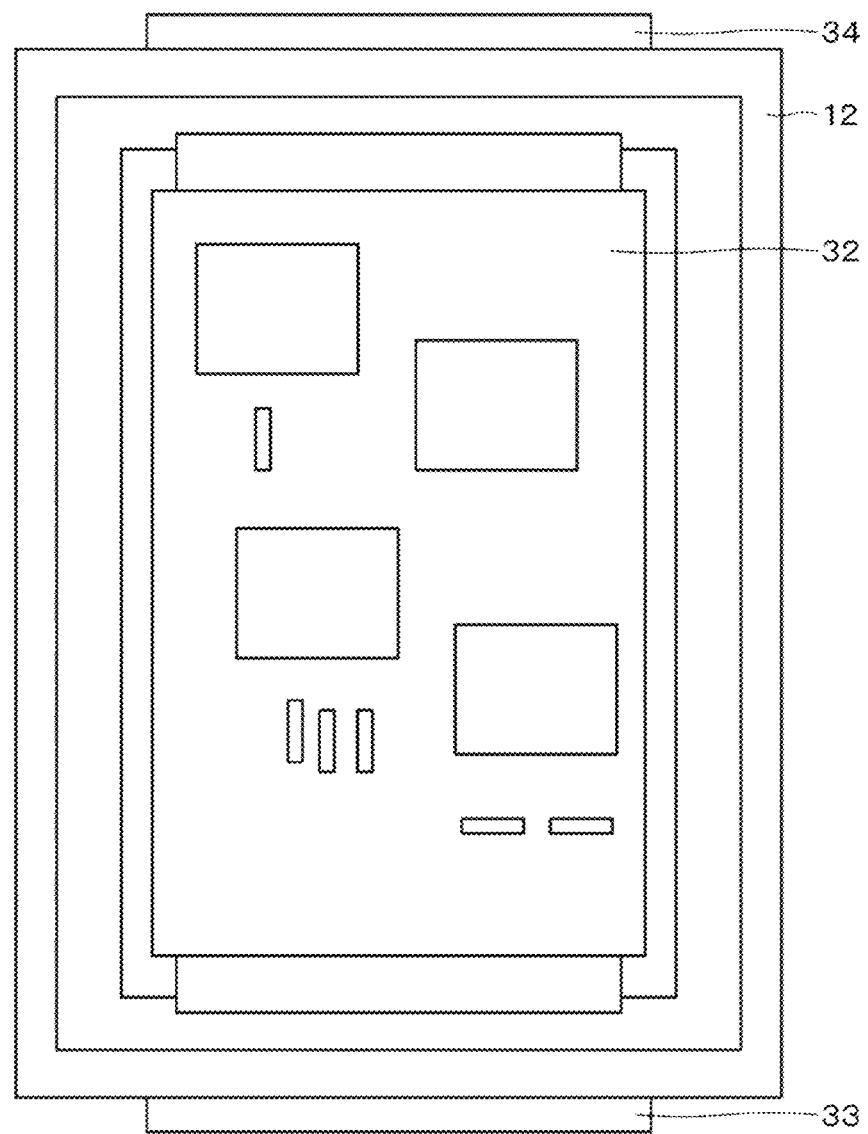
FIG. 25 is a sectional view for illustrating the all-solid-state battery according to the third embodiment of the present technology.

The all-solid-state battery including the electric circuit is illustrated in FIG. 24 (sectional view) and FIG. 25 (top view). The all-solid-state battery according to the third embodiment includes a barrier layer 10, a buffer layer 11, and an impact-resistant layer 12 around a positive electrode layer and a negative electrode layer and the like. This is similar to those of the first and second embodiments. In FIG. 24, the details of the positive electrode layer 3 (positive electrode active material layer 3a and positive electrode current collecting layer 3b), the negative electrode layer 4, the solid electrolyte layer 5, the separation layer 6, and the protective layer 7 as described in FIG. 1 and FIG. 15 are omitted. In FIG. 24, only one barrier layer 11 is described for simplicity, but two or more barrier layers 11 may be provided as in the first embodiment.

A component-mounted circuit board 32 is disposed between the buffer layer 11 and the impact-resistant layer 12, which is a characteristic portion of the all-solid-state battery according to the third embodiment. As illustrated in FIG. 24, a positive electrode 33 and a negative electrode 34 are disposed as electrodes similar to the metal plate according to the second embodiment. The positive electrode 33 and the negative electrode 34 extend as in the metal plate in Example 2, and one extended portion is bent outward in a substantially L-shape. Unlike the second embodiment, the positive electrode 33 and the negative electrode 34 include the other extended portion bent inward in a substantially L-shape, and are electrically connected to the component-mounted circuit board 32. Since the members of the all-solid-state battery according to the third embodiment are the same as those in the first embodiment, the descriptions of materials and quality of materials will be omitted.

(One Example of Method for Preparing All-Solid-State Battery)

The all-solid-state battery according to the third embodiment is the same as that in the second embodiment except that the component-mounted circuit board 32 and the like are mounted. As in the second embodiment, a barrier layer 11 and a buffer layer 12 were prepared, and a component-mounted circuit board 32 was then disposed. A positive electrode 33 and a negative electrode 34 were electrically connected to the component-mounted circuit board 32. At this point, the component-mounted circuit board 32 does not need to be completely soldered, and a solder paste before a heat treatment may be partially present as is. In that case, the all-solid-state battery can be then placed in a reflow furnace to complete the soldering. As illustrated in FIG. 24, the all-solid-state battery was covered by an impact-resistant layer 12.

4. Application Examples

"Universal Credit Card as Application Example"

Hereinafter, an application example in which the present technology is applied to a universal credit card will be described.

The universal credit card is a card in which functions of a plurality of credit cards or point cards or the like are integrated into one card. In this card, for example, information such as numbers and expiration dates of various credit cards and point cards can be incorporated. If a user puts the one universal credit card in his/her wallet, the user can choose and use cards whenever and whatever the user wants.

Figure 26:
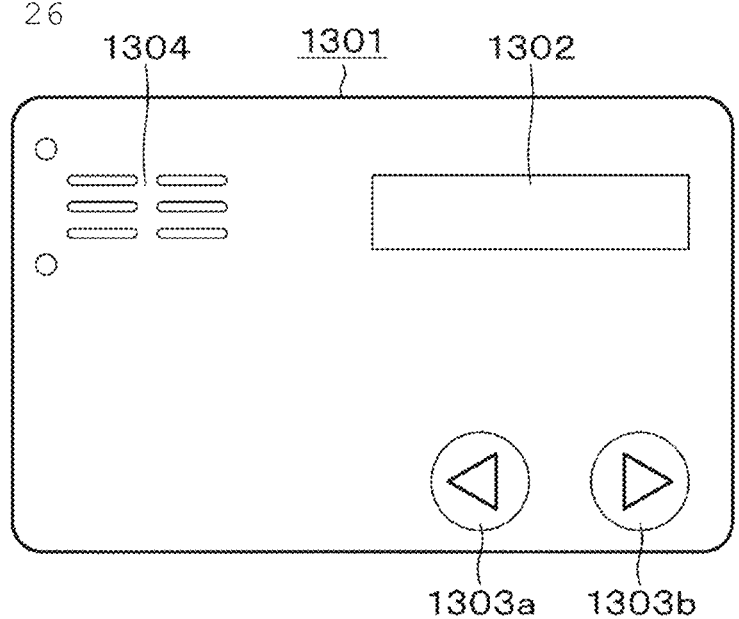
FIG. 26 is a plan view illustrating an example of the appearance of a universal credit card as an application example.

FIG. 26 illustrates an example of the configuration of a universal credit card 1301.

The universal credit card 1301 includes a card type shape and includes an IC chip and an all-solid-state battery (not illustrated) provided therein. The universal credit card 1301 includes a low-power-consumption display 1302 mounted on one surface thereof, direction keys 1303a and 1303b as an operation part, and a charging terminal 1304. The all-solid-state battery is a battery according to any one of the first embodiment, the second embodiment, the third embodiment, and the modified examples thereof.

For example, the user can operate the direction keys 1303a and 1303b while looking at the display 1302 to designate a desired one of a plurality of credit cards loaded on the universal credit card 1301 in advance. The designated credit card can be used in the same manner as a conventional credit card.

The above is an example, and it goes without saying that the battery according to any of the first embodiment, the second embodiment, the third embodiment, and the modified examples thereof can be applied to all electronic cards other than the universal credit card 1301.

"Sensor Network Terminal as Application Example"

Hereinafter, an application example in which the present technology is applied to a sensor network terminal will be described.

A wireless terminal in a wireless sensor network is called a sensor node, and is configured to include one or more wireless chips, a microprocessor, and a power source (battery) and the like. A specific example of the sensor network is used to monitor energy saving management, health management, industrial measurement, traffic conditions, and agriculture and the like. As a type of sensors, voltage, temperature, gas, or illuminance or the like is used.

In the case of the energy saving management, as a sensor node, a power monitor node, a temperature/humidity node, an illuminance node, a $CO_2$ node, a human touch node, a remote control node, and a router (repeater) and the like are used. These sensor nodes are provided to configure a wireless network in homes, office buildings, factories, shops, and amusement facilities, and the like.

Data such as temperature, humidity, illuminance, $CO_2$ concentration, and electric energy are displayed, and the conditions of energy saving of the environment can be seen. Furthermore, on/off control for lighting, air conditioning facilities, and ventilation facilities and the like is performed by a command from a control station.

ZigBee (registered trademark) can be used as one of wireless interfaces of the sensor network. The wireless interface is one of short distance wireless communication standards, and has characteristics that it has a short transferable distance and a low transfer rate but is inexpensive and consumes low power. Therefore, it is suitable for mounting on a battery-driven device. A basic portion of the communication standards is standardized as IEEE 802.15.4. Communication protocols between devices above a logical layer are formulated by the ZigBee (registered trademark) Alliance.

Figure 27:
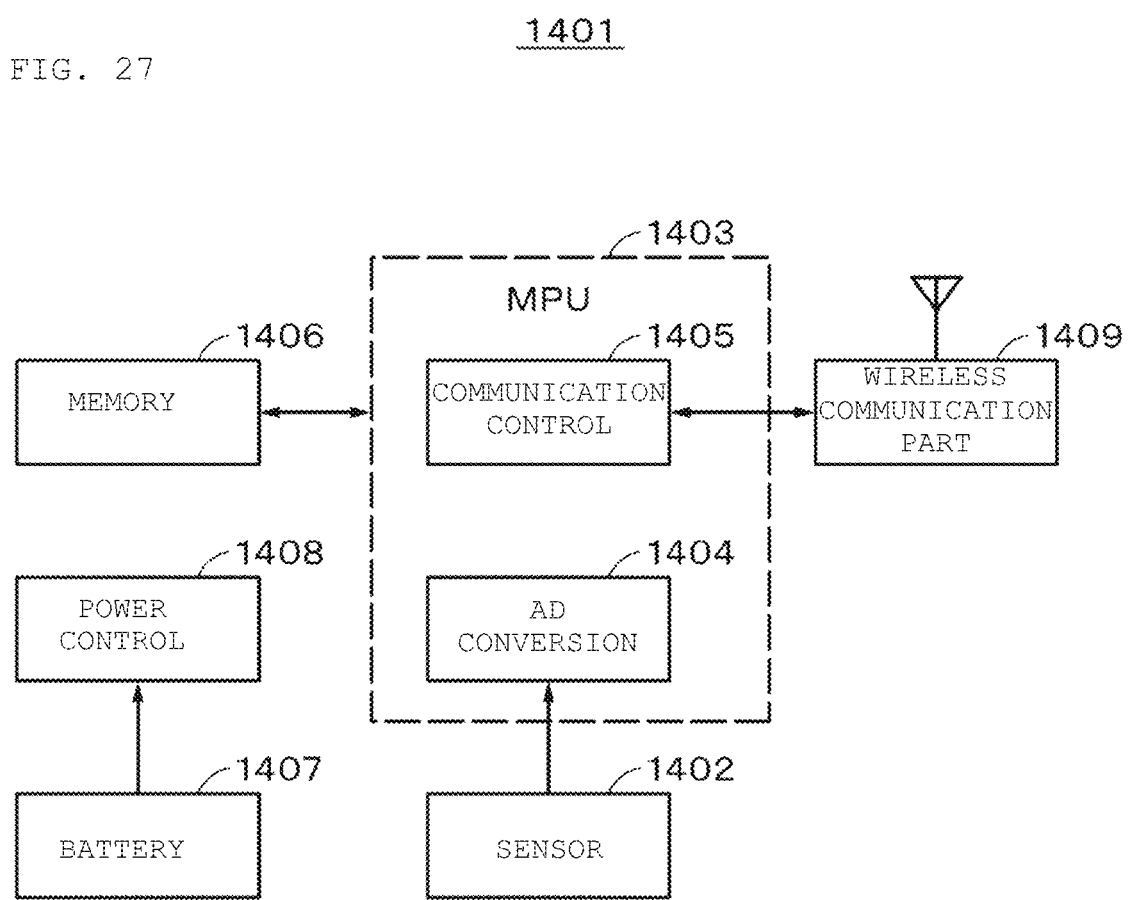
FIG. 27 is a block diagram illustrating an example of the configuration of a wireless sensor node as an application example.

FIG. 27 illustrates an example of the configuration of a wireless sensor node 1401. A detection signal of a sensor 1402 is supplied to an AD conversion circuit 1404 of a microprocessor (MPU) 1403. Various sensors described above can be used as the sensor 1402. A memory 1406 is provided in association with the microprocessor 1403. Furthermore, the output of the battery 1407 is supplied to a power control part 1408, and the power of the sensor node 1401 is managed. The battery 1407 is a battery according to any one of the first embodiment, the second embodiment, the third embodiment, and the modified examples thereof.

A program is installed on the microprocessor 1403.

The microprocessor 1403 processes data on the detection results of the sensor 1402 output from the AD conversion circuit 1404 according to the program. A wireless communication part 1409 is connected to a communication control part 1405 of the microprocessor 1403, and the data on the detection results from the wireless communication part 1409 are transmitted to a network terminal (not illustrated) using, for example, ZigBee (registered trademark) and connected to the network via the network terminal. A predetermined number of wireless sensor nodes can be connected to one network terminal. As the form of the network, forms such as a tree type, a mesh type, and a linear type, in addition to a star type can be used.

"Wristband Type Electronic Device as Application Example"

Hereinafter, an application example in which the present disclosure is applied to a wristband type electronic device will be described.

The wristband type electronic device is also called a smart band, and is wound only around an arm and as a result can acquire data on human activities such as the number of steps, moving distance, calories burned, sleep amount, and heart rate. Furthermore, the acquired data can also be managed by a smartphone. Furthermore, the wristband type electronic device can include a mail transmitting/receiving function, and for example, can notify a user of an arrival of mail by a light emitting diode (LED) lamp and/or vibration.

Figure 28:
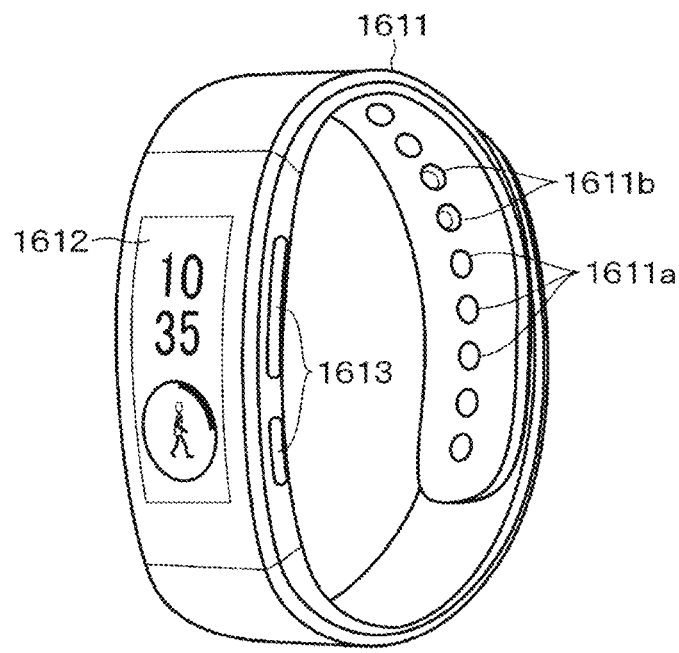
FIG. 28 is a perspective view illustrating an example of the appearance of a wristband type electronic device as an application example.

FIG. 28 illustrates an example of the appearance of a wristband type electronic device 1601. The electronic device 1601 is a so-called wearable device of a wrist watch type which is detachable from the human body. The electronic device 1601 includes a band part 1611 attached on an arm, a display device 1612 which displays numbers, characters, and patterns and the like, and an operation button 1613. The band part 1611 is provided with a plurality of hole parts 1611a and protrusions 1611b provided on an inner circumferential surface (surface on a side which contacts the arm when the electronic device 1601 is attached) thereof.

When the electronic device 1601 is in a use state, the electronic device 1601 is worn on an arm by curving the band part 1611 so that the band part 1611 is substantially circular as illustrated in FIG. 28 and inserting the protrusions 1611b into the hole parts 1611a. By adjusting the position of the hole part 1611a into which the protrusion 1611b is inserted, a size of a diameter can be adjusted according to the thickness of the arm. When the electronic device 1601 is not used, the protrusion 1611b is removed from the hole part 1611a, and the band part 1611 is stored in a substantially flat state. A sensor (not illustrated) is provided inside the band part 1611 substantially over the whole of the band part 1611.

Figure 29:
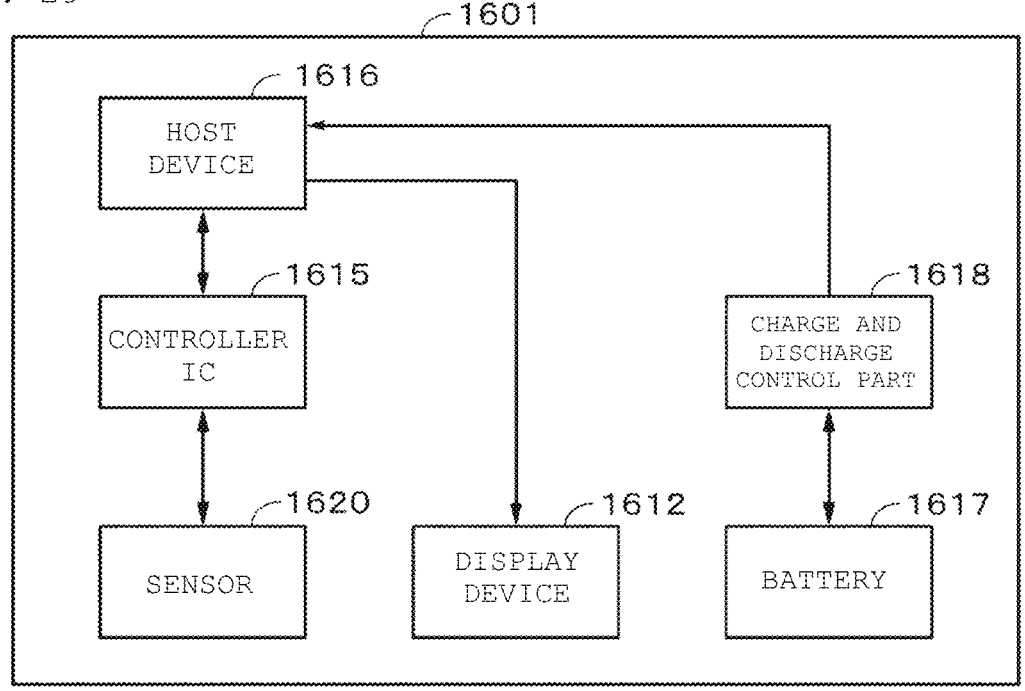
FIG. 29 is a block diagram illustrating an example of the configuration of a wristband type electronic device as an application example.

FIG. 29 illustrates an example of the configuration of the electronic device 1601. The electronic device 1601 includes a controller IC 1615 as a drive control part, a sensor 1620, a host device 1616, a battery 1617 as a power source, and a charge and discharge control part 1618, in addition to the display device 1612 described above. The sensor 1620 may include the controller IC 1615.

The sensor 1620 can detect both pressing and bending. The sensor 1620 detects a change in electrostatic capacitance according to the pressing, and outputs an output signal according to the change to the controller IC 1615. The sensor 1620 detects a change in a resistance value (change in resistance) according to the bending, and outputs an output signal according to the change to the controller IC 1615. The controller IC 1615 detects the pressing and bending of the sensor 1620 based on the output signal from the sensor 1620, and outputs information corresponding to the detection result to the host device 1616.

The host device 1616 executes various pieces of processing based on the information supplied from the controller IC 1615. For example, processing such as display of character information and image information and the like on the display device 1612, movement of a cursor displayed on the display device 1612, and scrolling of a screen are executed.

The display device 1612 is, for example, a flexible display device, and displays a video (screen) based on a video signal or a control signal or the like supplied from the host device 1616. Examples of the display device 1612 include, but are not limited to, a liquid crystal display, an electro luminescence (EL) display, and an electronic paper.

The battery 1617 is a battery according to any one of the first embodiment, the second embodiment, the third embodiment, and the modified examples thereof. The charge and discharge control part 1618 controls the charge and discharge operation of the battery 1617. Specifically, the charging of the battery 1617 from an external power source or the like is controlled. The supply of power from the battery 1617 to the host device 1616 is controlled.

"Smart Watch as Application Example"

Hereinafter, an application example in which the present technology is applied to a smart watch will be described.

The smart watch has the same or similar appearance as the design of the existing wrist watch, is used by being worn on a user's arm like the wrist watch, and has a function of notifying a user of various messages such as arrival of a telephone call or an electronic mail by information displayed on a display. The smart watch may have functions such as an electronic money function and an activity meter, and may have a function of performing near field communications such as a communication terminal (smartphone and the like) and Bluetooth (registered trademark).

Figure 30:
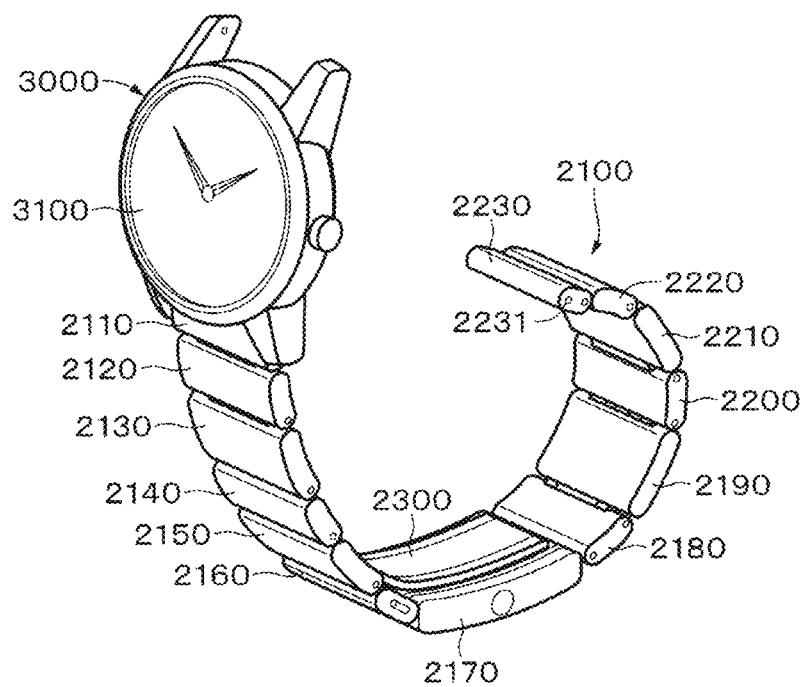
FIG. 30 is a perspective view illustrating an example of the whole configuration of a smart watch as an application example.

FIG. 30 illustrates an example of the overall configuration of a smart watch 2000. The smart watch 2000 includes a watch main body 3000 and a band type electronic device 2100. The watch main body 3000 includes a dial 3100 for displaying time. The watch main body 3000 may electronically display time on a liquid crystal display or the like instead of the dial 3100.

The band type electronic device 2100 is a metal band attached to the watch main body 3000, and worn on a user's arm. The band type electronic device 2100 has a configuration in which a plurality of segments 2110 to 2230 are connected. The segment 2110 is attached to one band attachment hole of the watch main body 3000, and the segment 2230 is attached to the other band attachment hole of the watch main body 3000.

Each of the segments 2110 to 2230 is composed of metal.

FIG. 30 illustrates a state where the watch main body 3000 and the segment 2230 are separated from each other in order to explain an example of the configuration of the band type electronic device 2100, but the segment 2230 is attached to the watch main body 3000 in actual use. By attaching the segment 2230 to the watch main body 3000, the smart watch 2000 can be worn on a user's arm like a normal wrist watch. Connection points of the segments 2110 to 2230 can be moved. Since the connection points of the segments can be moved, the band type electronic device 2100 can be fitted to a user's arm.

A buckle part 2300 is disposed between the segment 2170 and the segment 2160. The buckle part 2300 extends long when a lock is unlocked and becomes short when the lock is locked. Each of the segments 2110 to 2230 is configured to have a plurality of types of sizes.

An internal circuit of the band type electronic device 2100 has a configuration independent of the watch main body. The watch main body includes a movement part which rotates a needle disposed on the dial. A battery is connected to the movement part. The movement part or the battery is incorporated in a housing of the watch main body 3000. The battery is a battery according to any one of the first embodiment, the second embodiment, the third embodiment, and the modified examples thereof.

Electronic components and the like are disposed in three segments 2170, 2190 and 2210 among the segments 2110 to 2230. A data processing part, a wireless communication part, an NFC communication part, and a GPS part are disposed in the segment 2170. Antennas are connected to the wireless communication part, the NFC communication part, and the GPS part, respectively.

Each antenna is disposed in the vicinity of a slit (not illustrated) of the segment 2170.

The wireless communication part performs near field wireless communication with another terminal according to, for example, the Bluetooth (registered trademark) standard. The NFC communication part performs wireless communication with a reader/writer close to each other according to the NFC standard. The GPS part is a positioning part which receives radio waves from satellites of a system called a global positioning system (GPS) and measures a current position. Data obtained by the wireless communication part 4102, the NFC communication part 4104, and the GPS part 4106 are supplied to the data processing part 4101.

A display, a vibrator, a motion sensor, and a voice processing part are disposed in the segment 2170. The display and the vibrator function as a notification part which notifies a wearer of the band type electronic device 2100.

The display is configured by a plurality of light emitting diodes, and notifies a user by lighting or flickering the light emitting diodes. The plurality of light emitting diodes are disposed, for example, inside a slit (not illustrated) of the segment 2170, and the arrival of a telephone call, or the reception of an electronic mail or the like is notified by lighting or flickering the light emitting diodes. The display to be used may be a type in which characters and numbers and the like are displayed. The vibrator is a member for vibrating the segment 2170. The band type electronic device 2100 notifies arrival of a telephone call, or reception of an electronic mail or the like by causing the vibrator to vibrate the segment 2170.

The motion sensor detects the movement of a user wearing the smart watch 2000. As the motion sensor, an acceleration sensor, a gyro sensor, an electronic compass, or an atmospheric pressure sensor or the like is used. The segment 2170 may include a sensor other than the motion sensor. For example, a biosensor which detects a pulse or the like of a user wearing the smart watch 2000 may be incorporated. The microphone and the speaker are connected to the voice processing part, and the voice processing part performs processing on a call with the other party connected in a wireless communication scheme by the wireless communication part. The voice processing part can also perform processing for a voice input operation.

A battery is incorporated in the segment 2190, and a battery is incorporated in the segment 2210. The batteries supply driving power to circuits in each of the segments. The circuit in the segment 2170 and the batteries are connected to each other by a flexible circuit board. The batteries are batteries according to any one of the first embodiment, the second embodiment, the third embodiment, and the modified examples thereof.

"Glasses Type Terminal as Application Example"

Hereinafter, an application example in which the present technology is applied to a glasses type terminal represented by one type of head mounted display (HMD) will be described.

The glasses type terminal described below can display information such as texts, symbols, and images which are superimposed on a scenery in front of eyes. That is, a lightweight and thin image display device display module dedicated to a transmissive glasses type terminal is mounted.

This image display device includes an optical engine and a hologram light guide plate. The optical engine uses a micro-display lens to emit image light such as images and texts. This image light is incident on the hologram light guide plate. Since the hologram light guide plate includes hologram optical elements incorporated at both ends of a transparent plate, the image light from the optical engine is propagated through a very thin transparent plate like a thickness of 1 mm and thus is observed by observer's eyes. With such a configuration, a lens (including a protection plate in front of and behind the light guide plate) having a thickness of 3 mm which has a transmittance of, for example, 85% is realized. Such a glasses type terminal enables a player and a team's performance and the like to be observed in real time while watching sports, and a tourist guide on a tour site can be displayed.

Figure 31:
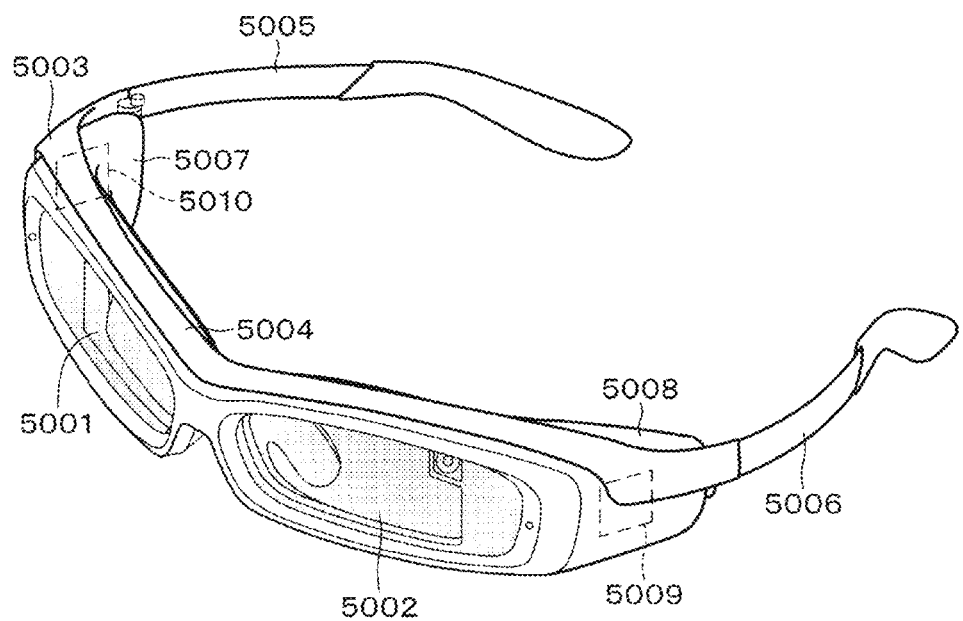
FIG. 31 is a perspective view illustrating an example of the appearance of a glasses-type terminal as an application example.

A specific example of the glasses type terminal includes one in which an image display part is configured as a glasses type as illustrated in FIG. 31. That is, like normal glasses, the glasses type terminal includes a frame 5003 for holding a right image display part 5001 and a left image display part 5002 in front of eyes. The frame 5003 includes a front part 5004 disposed in front of an observer, and two temple parts 5005 and 5006 rotatably attached to both ends of the front part 5004 by a hinge. The frame 5003 is composed of the same material as that constituting the normal glasses, such as metal, alloy, plastic, or a combination thereof. A headphone part may be provided.

The right image display part 5001 and the left image display part 5002 are disposed to be located in front of a user's right eye and in front of a user's left eye, respectively. The temple parts 5005 and 5006 hold the right image display part 5001 and the left image display part 5002 on a user's head. The right display drive part 5007 is disposed inside the temple part 5005 at the connection part between the front part 5004 and the temple part 5005. The left display drive part 5008 is disposed inside the temple part 5006 at the connection part between the front part 5004 and the temple part 5006.

Batteries 5009 and 5010 are provided on the frame 5003. The batteries 5009 and 5010 are batteries according to any one of the first embodiment, the second embodiment, the third embodiment, and the modified examples thereof. Although omitted in FIG. 31, the frame 5003 includes an acceleration sensor, a gyro, an electronic compass, and a microphone/speaker and the like. Furthermore, the frame 5003 includes an imaging device to be capable of shooting a still image/moving image. Furthermore, the frame 5003 includes a controller connected to the glasses part by, for example, a wireless or wired interface. The controller includes a touch sensor, various buttons, a speaker, and a microphone and the like. Furthermore, the frame 5003 has a cooperation function with a smartphone. For example, it is possible to provide information according to the user's situation by utilizing the GPS function of the smartphone.

"Power Storage System in Vehicle as Application Example"

Figure 32:
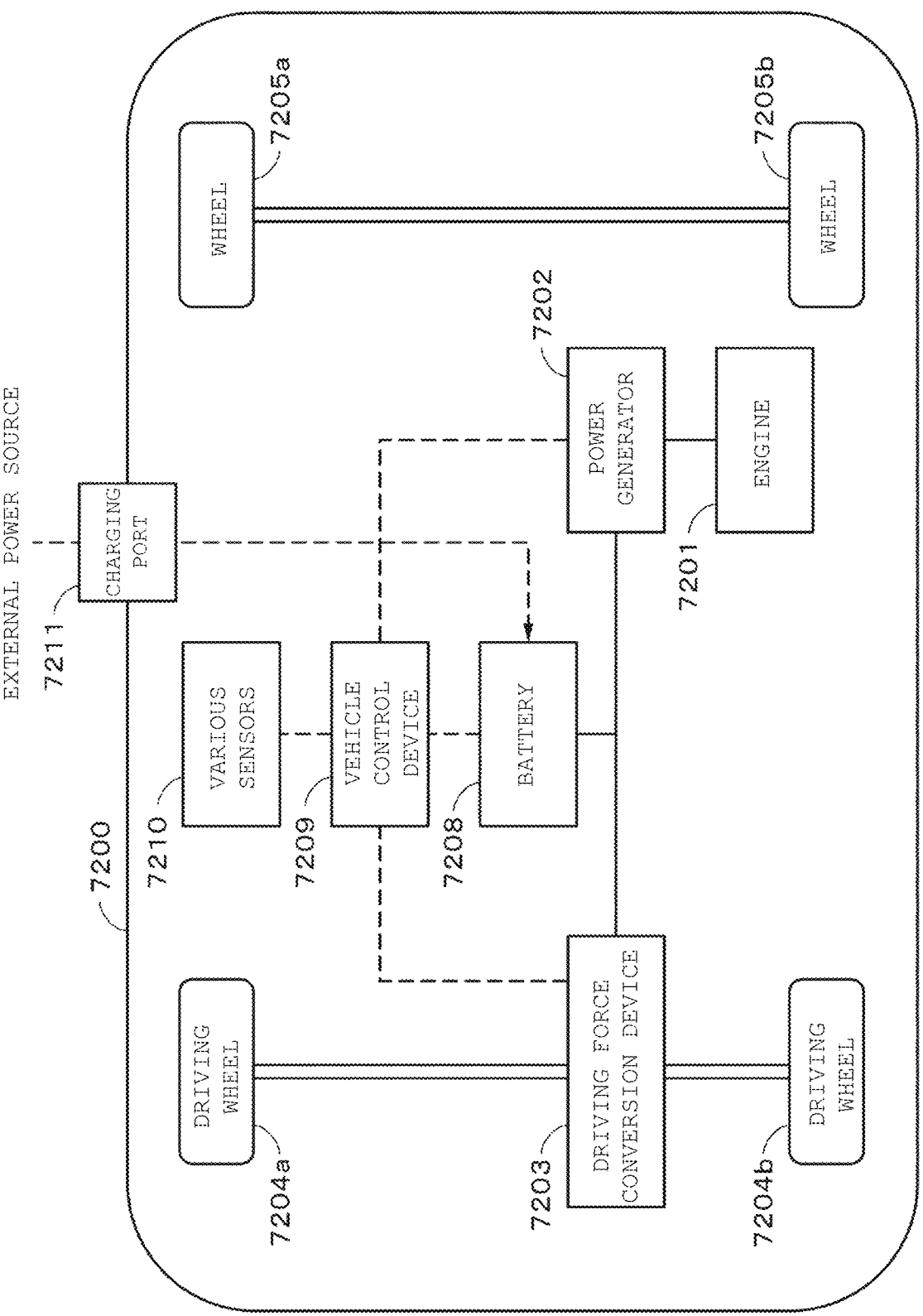
FIG. 32 is a schematic diagram illustrating an example of the configuration of a power storage system in a vehicle as an application example.

An example in which the present technology is applied to a power storage system for a vehicle will be described with reference to FIG. 32. FIG. 32 schematically illustrates an example of the configuration of a hybrid vehicle which employs a series hybrid system to which the present technology is applied. The series hybrid system is a car which travels by a power drive conversion device using power generated by a power generator driven by an engine or power stored in a battery once.

In a hybrid vehicle 7200, there are mounted an engine 7201, a power generator 7202, a power/driving force conversion device 7203, a driving wheel 7204a, a driving wheel 7204b, a wheel 7205a, a wheel 7205b, a battery 7208, a vehicle control device 7209, various sensors 7210, and a charging port 7211. The power storage device of the present technology described above is applied to the battery 7208.

The hybrid vehicle 7200 travels using the power/driving force conversion device 7203 as a power source. An example of the power/driving force conversion device 7203 is a motor. The power/driving force conversion device 7203 is operated by the power of the battery 7208, and the rotational force of the power/driving force conversion device 7203 is transmitted to the driving wheels 7204a and 7204b. By using direct current-alternate current conversion (DC-AC conversion) or inverse conversion (AC-DC conversion) at necessary portions, the power/driving force conversion device 7203 is applicable to any of an AC motor or a DC motor. The various sensors 7210 control the engine speed via the vehicle control device 7209 and control the opening degree of a throttle valve (not illustrated) (throttle opening degree). The various sensors 7210 include a speed sensor, an acceleration sensor, and an engine speed sensor and the like.

The rotational power of the engine 7201 is transmitted to the power generator 7202, and the power generated by the power generator 7202 can be stored in the battery 7208 by the rotational power.

When the hybrid vehicle is decelerated by a braking mechanism (not illustrated), a resistance at the time of deceleration is applied as a rotational force to the power/driving force conversion device 7203, and by the rotational force, the regenerative power generated by the power/driving force conversion device 7203 is accumulated in the battery 7208.

By being connected to a power source outside the hybrid vehicle, the battery 7208 can receive power supply from the external power source using the charging port 7211 as an input port, and store the received power.

Although not illustrated, an information processing apparatus performing information processing related to a vehicle control based on information on a secondary battery may be provided. Examples of the information processing apparatus include an information processing apparatus which displays a battery remaining quantity based on information on a battery remaining quantity.

In the above description, the series hybrid car traveling by a motor using the power generated by the generator driven by the engine or the power once stored in the battery has been described as an example. However, the present technology can effectively be applied to a parallel hybrid car in which both the outputs of the engine and the motor are drive sources, and thus three modes of traveling the parallel hybrid car only by the engine, traveling the parallel hybrid car only by the motor, and traveling the parallel hybrid car by the engine and the motor travel are appropriately switched and used. Furthermore, the present technology can be effectively applied to a so-called electric motor vehicle which travels only by a drive motor without using the engine.

The example of the hybrid vehicle 7200 to which the technology according to the present technology can be applied has been described above. The technology according to the present technology can be suitably applied to the battery 7208 among the configurations described above. That is, the battery 7208 is a battery according to any of the first embodiment, the second embodiment, the third embodiment, and the modified examples thereof.

As described above, the embodiments and the modified examples of the present technology have been specifically described, but the present technology is not limited to the embodiments and the modified examples thereof described above, and various modifications can be made based on the technical ideas of the present technology.

For example, the configurations, methods, processes, shapes, materials, and numerical values and the like described in the embodiments and the modified examples thereof described above are merely examples, and different configurations, methods, processes, shapes, materials, and numerical values and the like may be used as needed. Chemical formulas of compounds and the like are representative ones, and are not limited to the indicated valences and the like as long as they are common names of the same compounds.

The configurations, methods, processes, shapes, materials, and numerical values and the like of the embodiments and the modified examples thereof described above can be combined with one another without departing from the spirit of the present technology.

The present technology is applicable to various electronic devices including a battery, and is not limited to the electronic devices described in the application examples described above. Examples of the electronic devices other than the application examples described above include, but are not limited to, a notebook personal computer, a tablet computer, mobile phones (for example, smart phone and the like), personal digital assistants ("PDA"), display devices (LCD, EL display, electronic paper, and the like), imaging devices (for example, digital still camera, digital video camera, and the like), audio devices (for example, portable audio player), a game machine, a cordless handset, an electronic book, an electronic dictionary, a radio, a headphone, a navigation system, a memory card, a pacemaker, a hearing aid, an electric tool, an electric shaver, a refrigerator, an air conditioner, a television, a stereo, a water heater, a microwave oven, a dishwasher, a washing machine, a dryer, a lighting device, a toy, a medical device, a robot, a road conditioner, and a traffic light. Furthermore, the battery according to the present technology can be applied to a secondary battery of a power storage device provided in home.

DESCRIPTION OF REFERENCE SYMBOLS

1: All-solid-state battery
3: Positive electrode layer
3a: Positive electrode active material layer
3b: Positive electrode current collecting layer
4: Negative electrode layer
5: Solid electrolyte layer
6: Separation layer
7: Protective layer
8: Internal electrode
9: Metal wire
10: Buffer layer
11: Barrier layer
12: Impact-resistant layer
13: External electrode
14: Ni plating layer
15: Sn plating layer
16: Solder coating
21: All-solid-state battery
22: Metal plate
31: All-solid-state battery
32: Component-mounted circuit board
33: Positive electrode
34: Negative electrode

The invention claimed is:

1. An all state battery comprising:
a power storage part that includes a positive electrode layer, a negative electrode layer, an electrolyte layer interposed between the positive electrode layer and the negative electrode layer;
an internal electrode at an end surface of the power storage part;
an electrode extraction part electrically connected to the internal electrode;
a buffer layer covering the power storage part, the internal electrode and a first part of the electrode extraction part;
a barrier layer covering the buffer layer;
an impact-resistant layer covering the barrier layer such that a second part of the electrode extraction part extends from the impact-resistant layer, and
an external electrode on the impact-resistant layer.

2. The all-solid-state battery according to claim 1, wherein:
the electrode extraction part has a plate shape;
a third part of the electrode extraction part is connected to the internal electrode in a direction parallel to the internal electrode; and
the second part of the electrode extraction part extending from the impact-resistant layer is bent in an outward direction away from the power storage part.

3. The all-solid-state battery according to claim 1, further comprising an electric circuit between the barrier layer and the impact-resistant layer.

4. The all-solid-state battery according to claim 1, wherein the buffer layer contains a material having flexibility and elasticity.

5. The all-solid-state battery according to claim 4, wherein the material having flexibility and elasticity is polyimide silicone.

6. The all-solid-state battery according to claim 1, wherein the buffer layer is a first buffer layer and the barrier layer is a first barrier layer, and the all-solid-state battery further comprises a second buffer layer on the first barrier layer, and a second barrier layer on the second buffer layer.

7. The all-solid-state battery according to claim 6, further comprising a third buffer layer on the second barrier layer.

8. The all-solid-state battery according to claim 1, wherein the barrier layer contains nitride or oxynitride.

9. The all-solid-state battery according to claim 1, wherein the barrier layer contains silicon nitride or silicon oxynitride.

10. The all-solid-state battery according to claim 1, wherein the barrier layer contains silicon oxynitride having a light refractive index of 1.7 or more.

11. The all-solid-state battery according to claim 1, wherein the impact-resistant layer contains an epoxy resin and silica.

12. The all-solid-state battery according to claim 1, further comprising a Ni plating layer on the external electrode, a Sn plating layer on the Ni plating layer, and a solder coating on the Sn plating layer.

13. An all-solid state battery comprising:
a power storage part that includes a positive electrode layer, a negative electrode layer, and an electrolyte layer interposed between the positive electrode layer and the negative electrode layer;
an internal electrode at an end surface of the power storage part;
an electrode extraction part electrically connected to the internal electrode;
a plurality of alternating buffer layers and barrier layers covering the power storage part, the internal electrode and a first part of the electrode extraction part;
an impact-resistant layer covering the plurality of alternating barrier layers and buffer layers; and
an external electrode on the impact-resistant layer.

14. The all-solid-state battery according to claim 13, wherein:
the electrode extraction part has a plate shape;
a third part of the electrode extraction part is connected to the internal electrode in a direction parallel to the internal electrode; and the second part of the electrode extraction part extending from the impact-resistant layer is bent in an outward direction away from the power storage part.

15. The all-solid-state battery according to claim 13, further comprising an electric circuit between the barrier layer and the impact-resistant layer.

16. The all-solid-state battery according to claim 13, wherein the buffer layers contain polyimide silicone and the barrier layers contain silicon nitride or silicon oxynitride.

17. The all-solid-state battery according to claim 16, wherein the barrier layers contain silicon oxynitride having a light refractive index of 1.7 or more.

18. The all-solid-state battery according to claim 13, wherein the impact-resistant layer contains an epoxy resin and silica.

* * * * *